US 6,556,755 B2

(12) United States Patent
Tsukitani et al.

(10) Patent No.: US 6,556,755 B2
(45) Date of Patent: *Apr. 29, 2003

(54) DISPERSION-EQUALIZING OPTICAL FIBER AND OPTICAL TRANSMISSION LINE INCLUDING THE SAME

(75) Inventors: Masao Tsukitani, Kanagawa (JP); Eisuke Sasaoka, Kanagawa (JP); Shigeru Tanaka, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/917,744

(22) Filed: Jul. 31, 2001

(65) Prior Publication Data

US 2002/0031317 A1 Mar. 14, 2002

Related U.S. Application Data

(63) Continuation of application No. 09/564,421, filed on May 4, 2000, now Pat. No. 6,301,419, which is a continuation of application No. PCT/JP99/06755, filed on Dec. 2, 1999.

(30) Foreign Application Priority Data

Dec. 3, 1998 (JP) .......................................... 10-344512

(51) Int. Cl.$^7$ ................................................ G02B 6/22
(52) U.S. Cl. ........................................ 385/123; 385/127
(58) Field of Search ................................. 385/123–128

(56) References Cited

U.S. PATENT DOCUMENTS

| 4,261,639 A | 4/1981 | Kogelnik et al. ....... 385/123 X |
| 5,042,906 A | 8/1991 | Chesler et al. .............. 385/123 |
| 5,361,319 A | 11/1994 | Antos et al. ................. 385/123 |
| 5,559,920 A | 9/1996 | Chraplyvy et al. ......... 385/123 |
| 5,999,679 A | 12/1999 | Antos et al. ................. 385/127 |
| 6,178,279 B1 * | 1/2001 | Mukasa et al. .............. 385/123 |
| 6,263,138 B1 * | 7/2001 | Sillard et al. ................ 385/123 |
| 6,301,419 B1 * | 10/2001 | Tsukitani et al. ........... 385/123 |

FOREIGN PATENT DOCUMENTS

| EP | 0 724 171 | 7/1996 |
| JP | 10-325913 | 12/1998 |
| WO | WO99/42869 | 8/1999 |

OTHER PUBLICATIONS

Tsuda et al, "Broad Band Dispersion Slope Compensation of Dispersion Shifted Fiber Using Negative Slope Fiber", 24th European Conference On Optical Communication 1998, vol. 1, pp. 233–234, Sep. 1998.*

Akasaka et al, "Enlargement of Effective Core Area On Dispersion–Flattened Fiber and Its Low Nonlinearity", Optical Fiber Communication Conference (OFC '98) Technical Digest, pp. 302–303, Feb. 1998.*

(List continued on next page.)

Primary Examiner—John D. Lee
(74) Attorney, Agent, or Firm—McDermott, Will & Emery

(57) ABSTRACT

The present invention relates to an optical transmission line enabling WDM communications in a wide signal light wavelength band centered at a wavelength of 1.55μm, in which nonlinear optical phenomena are less likely to occur; and an optical fiber constituting a part of the optical transmission line. The optical fiber has a dispersion D (unit:ps/nm/km) and a dispersion slope S (unit:ps/nm$^2$/km) satisfying the conditions of $-69 \leq D \leq -35$ and $0.0050 \times D \leq S \leq 0.0025 \times D$; and, as characteristics with respect to light having a wavelength of 1.55 μm an effective area of 15 μm$^2$ or more and a bending loss of 50 dB/m or less when wound at a diameter of 20 mm.

69 Claims, 15 Drawing Sheets

OTHER PUBLICATIONS

Y. Akasaka et al., "Dispersion Flat Compensation Fiber For Dispersion Shifted Fiber", 22nd European Conference on Optical Communication (ECOC '96), Oslo, Norway, 1996, paper TuP.01, pp. 221–224. (Sep. 1996).

"Development of Dispersion Compensating Fiber for WDM Transmission", A. Akasaka et al., Technical Report of IEICE, vol. 95, No. 386, Nov. 24, 1995, pp. 33–38.

"Dispersion–shifted single mode fiber for high–bit rate and multiwavelength systems", V.A. Bhagavatula et al., OFC '95 Technical Digest, ThH1, pp. 259–260, 1995.

"Measurement of Nonlinear Refractive Index $n_2$ of Dispersion Compensating Fibres", L. Grüner–Nielsen et al., 22nd European Conference on Optical Communication, pp. 249–252, Sep. 1996.

* cited by examiner

Fig.12
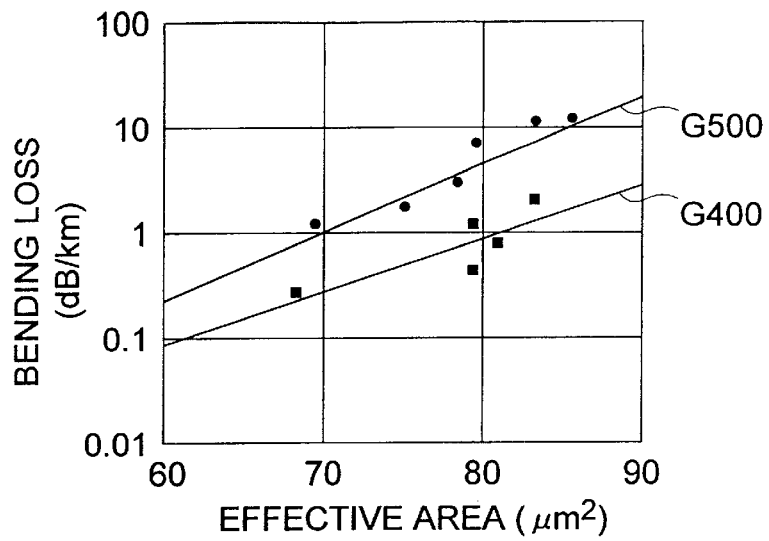
Fig.13A
|  | SAMPLE1 | SAMPLE2 | SAMPLE3 | SAMPLE4 |
|---|---|---|---|---|
| FIBER DIAMETER ($\mu$m) | 125.1 | 139.8 | 150.4 | 160.2 |
| MFD ($\mu$m) | 11.73 | 11.84 | 11.87 | 11.88 |
| EFFECTIVE AREA ($\mu$m$^2$) | 69.7 | 71.4 | 72.1 | 72.1 |
| CHROMATIC DISPERSION (ps/nm/km) | -2.1 | -2.2 | -2.0 | -1.9 |
| CUTOFF WAVELENGTH ($\mu$m) | 1.53 | 1.51 | 1.50 | 1.52 |
Fig.13B
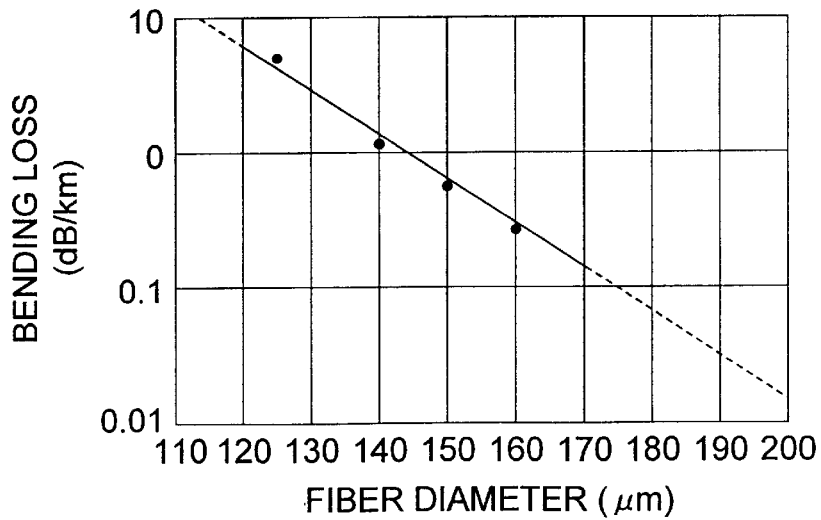

DISPERSION-EQUALIZING OPTICAL FIBER AND OPTICAL TRANSMISSION LINE INCLUDING THE SAME

This application is a continuation of application Ser. No. 09/564,421 filed May 4, 2000 (now U.S. Pat. No. 6,301,419) which is a continuation of PCT/JP99/06755 filed Dec. 2, 1299, now pending, which in turn claims the benefit of Japanese Patent Application No. 344512/1998, filed Dec. 3, 1998, the disclosures of which Applications are incorporated by reference herein. The benefit of the filing and priority dates of the International and Japanese Applications is respectfully requested.

RELATED APPLICATIONS

This is a Continuation application of International patent application No. PCT/JP99/06755 filed on Dec. 2, 1999, now pending which in turn claims the benefit of Japanese Patent Application No. 344512/1998, filed Dec. 3, 1998, the disclosures of which Applications are incorporated by reference herein. The benefit of the filing and priority dates of the International and Japanese Applications is respectfully requested.

BACKGROUND OF THE INVENTION

1. Field of the Invention

The present invention relates to an optical fiber applicable to large-capacity, high-speed WDM (Wavelength Division Multiplexing) optical transmission systems; and an optical transmission line including the same.

2. Related Background Art

A WDM optical transmission system enables large-capacity, high-speed optical communications since a plurality of signal lights (hereinafter referred to as WDM signals) in a 1.5-$\mu$m wavelength band (1500 nm to 1600 nm) propagate therethrough by way of a network of optical fiber transmission lines. In general, this optical transmission system comprises an optical amplifier for optically amplifying the WDM signals together, and the like in addition to optical fiber transmission lines which are a transmission medium. In such WDM communications, various techniques are under study in order to enable further larger capacity and higher speed.

How to reduce the dispersion and dispersion slope has been an important subject for study with respect to optical transmission lines. It is because of the fact that, though being monochromatic, each signal light propagating through an optical transmission line has a predetermined bandwidth, whereby the signal light sent out from a transmitting station may deform its waveform when reaching a receiving station by way of the optical transmission line, thus deteriorating its reception.

For securing the quality of an optical transmission line, it is desirable that the dispersion of the optical transmission line in its signal light wavelength band be as small as possible. For realizing larger-capacity communications, on the other hand, it is necessary for the optical transmission line to suppress the dispersion in a wavelength band as wide as possible, and it is desirable that the dispersion slope of the optical transmission line be as small as possible. Therefore, dispersion-flattened optical fibers in which both the dispersion and dispersion slope are substantially zero in the 1.5-$\mu$m wavelength band have conventionally been studied for use as an optical transmission line. Here, the dispersion slope refers to the gradient of a graph indicating the wavelength dependence of dispersion.

SUMMARY OF THE INVENTION

As a result of studies concerning the above-mentioned conventional techniques, the inventors have found the following problems.

Namely, as compared with typical single-mode optical fibers having a zero-dispersion wavelength near a wavelength of 1.3 $\mu$m, the wavelength band dispersion-flattened optical fibers tend to have a greater optical energy per unit cross-sectional area since their effective area is smaller, though yielding a smaller dispersion in the 1.5-$\mu$m wavelength band. It means that nonlinear optical phenomena (four-wave mixing in particular) are relatively easily occur in the dispersion-flattened optical fibers. On the other hand, in an optical transmission system employing a dispersion-flattened optical fiber as an optical transmission line, it is necessary to reduce the power of signal light sent out from its transmitting station or repeater station, whereby the repeater spacing is inevitably shortened. It means that the number of stations to be installed would increase, whereby the optical transmission system to be realized becomes more expensive.

The optical transmission system employing a single-mode optical fiber as its optical transmission line and comprising a dispersion-compensating module for compensating for the dispersion of the optical transmission line is designed such that both the dispersion and dispersion slope are substantially zero in the 1.5-$\mu$m wavelength band. Also, as the dispersion-compensating module, one having a negative dispersion in the 1.5-$\mu$m wavelength band is employed. Since the dispersion-compensating module is desired to have a smaller size, the dispersion-compensating fiber to be employed in the dispersion-compensating module is required to be designed to yield large absolute values of both dispersion and dispersion slope so that the dispersion of the whole optical transmission line can be compensated for by a short length of the dispersion-compensating fiber. Therefore, the effective area of the dispersion-compensating optical fiber is very small. Since the dispersion-compensating fiber is wound like a coil having a diameter on the order of 50 to 100 mm, how to reduce its bending loss is an important technical issue in such a dispersion-compensating fiber. Here, since the dispersion-compensating fiber employed in the dispersion-compensating module has a large dispersion value, it cannot be utilized as a main line though it constitutes a part of the optical transmission line.

For overcoming the problems such as those mentioned above, it is an object of the present invention to provide an optical transmission line which enables WDM communications in a wide signal light wavelength band (1.5-$\mu$m wavelength band) centered at a wavelength of 1.55 $\mu$m and effectively restrains nonlinear optical phenomena from occurring, and an optical fiber constituting a part of the optical transmission line. In the following, the optical fiber according to the present invention will be referred to as a "dispersion-equalizing optical fiber", the use of which reduces dispersion and dispersion slope in the optical transmission line as a whole.

The dispersion-equalizing optical fiber according to the present invention is employed in a part of an optical transmission line which is a transmission medium for WDM communications between stations such as between a transmitting station and a receiving station, between repeater stations, between the transmitting station and a repeater station, between a repeater station and the receiving station, or the like. This dispersion-equalizing optical fiber is an optical fiber for reducing deviations in dispersion among wavelengths in its signal light wavelength band; and comprises a core region extending along a predetermined axis and a cladding region disposed on the outer periphery of the core region. The above-mentioned cladding region may comprise a depressed cladding structure constituted, at least, by an inner cladding, disposed on the outer periphery of the core region, having a refractive index lower than that of the core region; and an outer cladding, disposed on the outer periphery of the inner cladding, having a refractive index higher than that of the inner cladding.

In particular, the dispersion-equalizing optical fiber according to the present invention has a dispersion D (unit: ps/nm/km) and a dispersion slope S (unit: ps/nm²/km) satisfying the following conditions:

$$-83 \leq D \leq -18$$

$$0.0050 \times D \leq S \leq 0.0025 \times D$$

with respect to light having a wavelength of 1.55 μm.

Further, as characteristics with respect to light having a wavelength of 1.55 μm, this dispersion-equalizing optical fiber has an effective area of 15 μm² or more, preferably 17 μm² or more, further preferably 19 μm² or more. Here, as disclosed in Japanese Patent Application Laid-Open No. HEI 8-248251 (EP 0 724 171 A2), the effective area $A_{eff}$ is given by the following expression (1);

$$A_{eff} = 2\pi \left( \int_0^\infty E^2 r dr \right)^2 / \left( \int_0^\infty E^4 r dr \right) \quad (1)$$

where E is the electric field accompanying the propagating light, and r is the radial distance from the core center.

Since the dispersion D and dispersion slope S at the wavelength of 1.55 μm satisfy the above-mentioned conditions in this dispersion-equalizing optical fiber, when the ratio between the length of the dispersion-equalizing optical fiber and the length of a single-mode optical fiber having a zero-dispersion wavelength in the 1.3-μm wavelength band is appropriately adjusted, the respective absolute values of dispersion and dispersion slope in the whole optical transmission line constituted by the dispersion-equalizing optical fiber and single-mode optical fiber can be minimized (wavelength dependence can be reduced). Since the dispersion-equalizing optical fiber has an effective area of 15 μm² or more preferably 17 μm² or more, it effectively restrains nonlinear optical phenomena from occurring when disposed downstream from the single-mode optical fiber. For securing a higher transmission quality, it is preferable for the dispersion-equalizing optical fiber to have an effective area of 19 μm² or more. As a consequence of such a configuration, the bending loss of the dispersion-equalizing optical fiber becomes 50 dB/m or less, preferably 10 dB/m or less with respect to light having a wavelength of 1.55 μm when wound at a diameter of 20 mm.

The dispersion-equalizing optical fiber according to the present invention may have a refractive index profile of a depressed cladding structure realized by the above-mentioned core region and a cladding region comprising an inner cladding and an outer cladding. Consequently, the respective values of dispersion, dispersion slope, and effective area can easily be designed so as to satisfy the above-mentioned conditions and ranges. Also, the dispersion-equalizing optical fiber may further comprise an intermediate cladding disposed between the inner cladding and outer cladding. The intermediate cladding has a refractive index higher than that of the outer cladding and lower than that of the core region, and may be disposed in direct contact with the inner cladding or disposed on the outer periphery of the inner cladding by way of another intermediate cladding having a refractive index lower than that of the former intermediate cladding. In any of these configurations, a refractive index profile of a depressed cladding structure is realized.

In the dispersion-equalizing optical fiber according to the present invention, the core region has a relative refractive index difference of 0.72% or more but 1.8% or less, preferably 0.9% or more but 1.6% or less, with respect to the cladding region or the outer cladding (in the case of a depressed cladding structure). In such a case, the respective values of dispersion, dispersion slope, and effective area can also easily be designed so as to satisfy the above-mentioned conditions and ranges. Therefore, with respect to light having a wavelength of 1.55 μm, the bending loss at a diameter of 20 mm can easily be made 50 dB/m or less, preferably 10 dB/m or less. For yielding further preferable transmission characteristics, the polarization mode dispersion of the dispersion-equalizing optical fiber is 0.15 ps·km$^{-1/2}$ or less with respect to light having a wavelength of 1.55 μm.

The bending loss, which becomes a limiting factor for making a module, can be reduced not only by enhancing the effective area as mentioned above, but also by adjusting the fiber diameter, the outside diameter of a coating layer covering the dispersion-equalizing optical fiber, and the like. Specifically, as the fiber diameter increases from a standard of 125 μm, the effect of reducing the bending loss enhances. For securing the flexibility of the dispersion-equalizing optical fiber, however, the upper limit of the fiber diameter is preferably 200 μm or less. On the other hand, when adjusting the outside diameter of the coating layer disposed on the outer periphery of the dispersion-equalizing optical fiber, the effect of reducing the bending loss can be obtained if the outside diameter of the coating layer is 235 μm or more. For securing a flexibility sufficient for constructing a module, the outside diameter of the coating layer is preferably 415 μm or less. While a desirable reducing effect can be obtained when one of the fiber diameter and the outside diameter of the coating layer is adjusted, similar effects can also be obtained when these two adjusting methods are combined together. Namely, when reducing the bending loss by increasing the outside diameter of the coating layer, a desirable reducing effect can be obtained even if the fiber diameter is decreased, whereby it will be sufficient if the fiber diameter is 115 μm or more.

The optical transmission line according to the present invention is a transmission medium disposed between stations for transmitting/receiving data, such as a transmitting station, repeater stations, and a receiving station; and comprises, as viewed in the propagating direction of WDM signals, a single-mode optical fiber, disposed on the upstream side, having a zero-dispersion wavelength near a wavelength of 1.3 μm, specifically within the range from 1.25 μm to 1.45 μm, and the above-mentioned dispersion-equalizing optical fiber disposed on the downstream side. In such an optical transmission line, when the length of the single-mode optical fiber and the length of the dispersion-equalizing optical fiber are set so as to have an appropriate ratio therebetween, the respective absolute values of the dispersion and dispersion slope in the whole optical transmission line can be minimized. Here, since the line comprising the dispersion-equalizing optical fiber and the single-mode optical fiber allows to be connected to a station by way of another single-mode optical fiber such as a dispersion-shifted optical fiber, the total length m of the dispersion-equalizing optical fiber and single-mode optical fiber preferably satisfies the following condition:

$$0.9 \times L < m \leq L$$

where L is the length of the optical transmission line, i.e., the distance between stations between which the optical transmission line is installed.

In the above-mentioned optical transmission line, since the dispersion-equalizing optical fiber (having an effective area of 15 $\mu m^2$ or more) is disposed downstream from the single-mode optical fiber (e.g., an optical fiber whose core is doped with Ge element), nonlinear optical phenomena are restrained from occurring. In particular, when the transmission loss of this single-mode optical fiber is 3.3 dB or more with respect to light having a wavelength of 1.55 $\mu m$, if the signal light sent out from the transmitting station has such a power that nonlinear optical phenomena do not occur (or do not become problematic if any) in the single-mode optical fiber, then the nonlinear optical phenomena are also sufficiently restrained from occurring in the dispersion-equalizing optical fiber located on the downstream side.

Since the dispersion of the dispersion-equalizing optical fiber at a wavelength of 1.55 $\mu m$ is −83 ps/nm/km or more but −18 ps/nm/km or less, and the dispersion of the single-mode optical fiber at the wavelength of 1.55 $\mu m$ is 17 ps/nm/km, the ratio of the length of the single-mode optical fiber to the length of the dispersion-equalizing optical fiber is on the order of 1:1 to 1:4.9. When such an optical transmission line is employed as the transmission line between individual repeaters in a submarine cable, in view of the fact that one span (repeater spacing) of the submarine cable is about 50 km in general, it is necessary for the above-mentioned single-mode optical fiber to have a length of less than 42 km. Further, for effectively suppressing the nonlinear optical phenomena, the upper limit of the ratio of length occupied by the single-mode optical fiber in the optical transmission line is about 73% (36.5 km). At this time, letting the transmission loss of the single-mode optical fiber whose core is doped with Ge element be 0.195 dB/km, the upper limit of the total transmission loss in the single-mode optical fiber is preferably 7.1 dB or less.

On the other hand, the single-mode optical fiber (having a zero-dispersion wavelength near 1.3 $\mu m$) constituting a part of the above-mentioned optical transmission line may be a single-mode optical fiber constituted by a core and a cladding, in which the cladding in particular is doped with F element (whereas the core is made of pure silica). This optical transmission line is favorable not only in that it can minimize the respective absolute values of total dispersion and dispersion slope, thus restraining nonlinear optical phenomena from occurring, but also in that transmission loss and splice loss are small. In particular, when the transmission loss of this F-doped single-mode optical fiber is 3.0 dB or more with respect to light having a wavelength of 1.55 $\mu m$, if the signal light sent out from the transmitting station has such a power that nonlinear optical phenomena do not occur (or do not become problematic if any), then the nonlinear optical phenomena are sufficiently restrained from occurring in the dispersion-equalizing optical fiber located on the downstream side as well. When its application to a submarine cable having one span of about 50 km is taken into consideration, the single-mode optical fiber having an F-doped cladding is also required to have a length of less than 42 km. Also, for effectively suppressing the nonlinear optical phenomena, the upper limit of the ratio of length of the single-mode optical fiber in the optical transmission line is preferably about 73% (36.5 km); and, letting the transmission loss of the F-doped single-mode optical fiber be 0.175 dB/km, the total transmission loss in the F-doped single-mode optical fiber is preferably 6.4 dB or less.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a sectional view showing a basic configuration in a first embodiment of the dispersion-equalizing optical fiber according to the present invention, whereas

FIG. 10 A is a chart showing the refractive index profile of a second embodiment of the dispersion-equalizing optical fiber according to the present invention, whereas

FIG. 11A is a sectional view showing a basic configuration in a first embodiment of the single-mode optical fiber disposed on the upstream of the optical transmission line, whereas

FIG. 12 is a graph showing relationships between the effective area Puff and bending loss at a diameter of 20 mm concerning a plurality of samples in which their respective coating layers have different outside diameters;

FIG. 13A is a table showing manufacturing parameters of a plurality of samples having different fiber diameters, whereas FIG. 13B is a graph showing the measured relationship between the fiber diameter and the bending loss at a diameter of 20 mm concerning the samples shown in FIG. 13A;

FIG. 15A is a view showing the configuration of a first embodiment of the optical transmission line according to the present invention, whereas

DESCRIPTION OF THE PREFERRED EMBODIMENTS

Figure 1A:
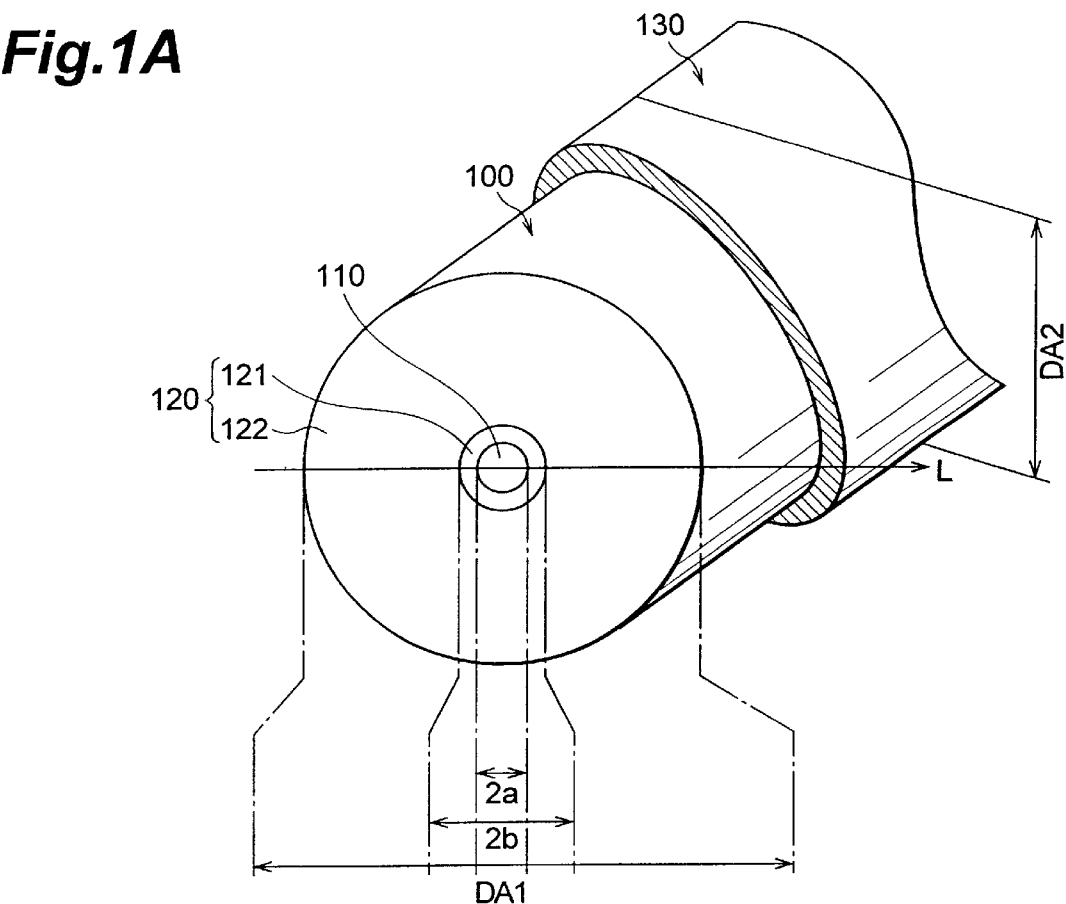

In the following, embodiments of the dispersion-equalizing optical fiber according to the present invention and the optical transmission line including the same will be explained with reference to FIGS. 1A to 2D, 3 to 9, 10A to 11B, 12, 13A and 13B, 14, and 15A and 15B. Among the drawings, constituents identical to each other will be referred to with numerals or letters identical to each other without repeating their overlapping explanations.

First, the dispersion-equalizing optical fiber according to the present invention has a dispersion D (unit: ps/nm/km) and a dispersion slope S (unit; ps/nm²/km ) satisfying the following conditions;

$$-83 \leq D \leq -18 \quad (2)$$

$$0.0050 \times D \leq S \leq 0.0025 \times D \quad (3)$$

at a wavelength of 1.55 μm. As a consequence, both the dispersion and dispersion slope become substantially zero in an optical transmission line constituted by this dispersion-equalizing optical fiber and a single-mode optical fiber having a zero-dispersion wavelength near a wavelength of 1.3 μm, specifically within the range of 1.25 μm or more but 1.45 μm or less. Since the line comprising the dispersion-equalizing optical fiber and the single-mode optical fiber allows to be connected to a station by way of another single-mode optical fiber such as a dispersion-shifted optical fiber, the total length m of the dispersion-equalizing optical fiber and the above-mentioned single-mode optical fiber satisfies the condition of 0.9×L<m≤L where L is the length of the optical transmission line, i.e., the distance between stations between which the optical transmission line is installed. At this time, it will be sufficient if the ratio of length of the dispersion-equalizing optical fiber to the whole length of the optical transmission line is about 50% or less. From the viewpoint of reducing the ratio of length of the dispersion-equalizing optical fiber to the whole length of the optical transmission line, it is preferable for the dispersion D to be smaller (to be a negative number with a greater absolute value). However, when the dispersion D is smaller, then it becomes necessary to enhance the refractive index of the core region in terms of design, whereby its nonlinear refractive index increases together with transmission loss. Therefore, the lower limit of dispersion D is preferably about –83 ps/nm/km.

The effective area of the dispersion-equalizing optical fiber according to this embodiment is 15 μm² or more, preferably 17 μm² or more, further preferably 19 μm² or more. Such a configuration makes it possible to realize a dispersion-equalizing optical fiber in which the dispersion D and dispersion slope S at a wavelength of 1.55 μm satisfy the above-mentioned expressions (2) and (3), whereas the bending loss at a diameter of 20 mm is 50 dB/m or less, preferably 10dB/m or less. From the view point of restraining nonlinear optical phenomena from occurring, it is preferable for the dispersion-equalizing optical fiber to have a larger effective area. For yielding further preferable transmission characteristics, the polarization mode dispersion of the dispersion-equalizing optical fiber is 0.15ps·km$^{-1/2}$ or less with respect to light having a wavelength of 1.55 μm.

Figure 1B:
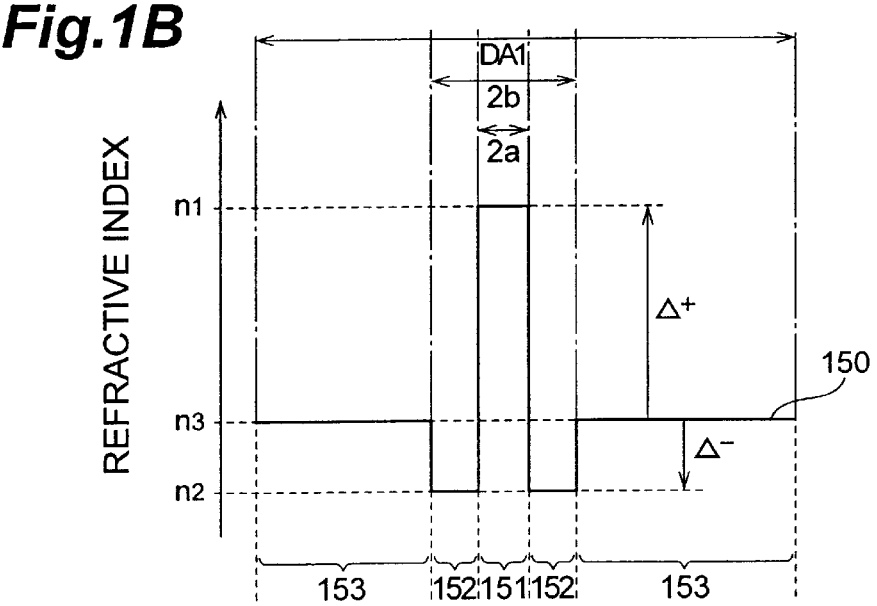
FIG. 1B is a chart showing a refractive index profile of the dispersion-equalizing optical fiber shown in FIG. 1A.

FIG. 1A is a view showing a cross-sectional structure in a first embodiment of the dispersion-equalizing optical fiber according to the present invention, whereas FIG. 1B is a chart showing a refractive index profile of the dispersion-equalizing optical fiber shown in FIG. 1A.

As shown in FIG. 1A, the dispersion-equalizing optical fiber 100 according to the first embodiment is a single-mode optical fiber, mainly composed of silica glass, having a diameter (fiber diameter) DA1, whereas a coating layer 130 having an outside diameter DA2 is disposed on the outer periphery thereof. This dispersion-equalizing optical fiber 100 comprises a core region 110 which is a region extending along a predetermined axis and has a refractive index $n_1$ and an outside diameter $2a$, and a cladding region 120 disposed on the outer periphery of the core region 110. The cladding region 120 comprises an inner cladding 121 which is a region disposed on the outer periphery of the core region 110 and has an outside diameter $2b$ and a refractive index $n_2$ lower than that of the core region 110; and an outer cladding 122 which is a region disposed on the outer periphery of the inner cladding 121 and has a refractive index $n_3$ higher than that of the inner cladding 121 and lower than that of the core region 110.

The abscissa of the refractive index profile 150 shown in FIG. 1B corresponds to individual positions along the line L in FIG. 1A on a cross section perpendicular to the center axis of the core region 110. Therefore, in the refractive index profile 150 of FIG. 1B, regions 151, 152, and 153 indicate the respective refractive indices at individual positions on the line L of the core region 110, inner cladding 121, and outer cladding 122.

The refractive index profile 150 of such a depressed cladding structure can be realized, for example, by doping the core region 110 with Ge element and doping the inner cladding 121 with F element. On the other hand, the relative refractive index difference $\Delta^+$ of the core region 110 with respect to the outer cladding 122 and the relative refractive index difference $\Delta^-$ of the inner cladding region 121 with respect to the outer cladding 122 are defined as follows:

$$\Delta^+ = (n_1 - n_3)/n_3$$

$$\Delta^- = (n_2 - n_3)/n_3$$

where $n_1$ is the refractive index of the core region 110, $n_2$ is the refractive index of the inner cladding 121, and $n_3$ is the refractive index of the outer cladding 122. In this specification, the relative refractive index difference $\Delta$ is expressed in terms of percentage, and the respective refractive indices of individual regions in each defining expression may be arranged in any order. Therefore, $\Delta$ having a negative value indicates that the refractive index of its corresponding region is lower than that of the outer cladding 122, and is expressed by $\Delta^-$ in this specification (a positive value of $\Delta$ is expressed by $\Delta^+$).

The relationship between the effect of suppressing nonlinear optical phenomena in the dispersion-equalizing optical fiber according to the present invention and its effective area will now be explained with reference to FIGS. 2A to 2D. First, nonlinear index $\Delta\phi$, as an index for quantitatively expressing nonlinear characteristics, is defined by the value obtained when the degree of modulation by self-phase modulation (SPM) is integrated over the whole optical transmission line as shown in the following expression (4):

$$\Delta\phi = (2\pi/\lambda) \cdot \left( \int_0^L (N_2(Z)/A_{eff}(Z)) \cdot P(Z) dz \right) \times k \quad (4)$$

$$= (2\pi/\lambda) \cdot (N_2/A_{eff}) \cdot ((1 - e^{-\alpha L})/\alpha) \cdot P_0 \times k$$

where L is the fiber length, $\lambda$ is the incident light wavelength, $N_2$ is the nonlinear refractive index, $A_{eff}$ is the effective area, and $P_0$ is the incident light power (determined so as to attain a constant optical power at the exit end). Also, coefficient k is determined such that the nonlinear index $\Delta\phi$ becomes 1 when an optical transmission line having a length of 50 km is constituted solely by a single-mode optical fiber whose cladding is doped with F element. The refractive index N of a medium under strong light varies depending on the light intensity as mentioned above. Therefore, the lowest-order effect with respect to this refractive index N is expressed as indicated by the following expression (5):

$$N = N_0 + N_2 \cdot P/A_{eff} \quad (5)$$

where $N_0$ is the refractive index with respect to linear polarization, $N_2$ is the nonlinear refractive index with respect to the third-order nonlinear polarization, P is the optical power, and $A_{eff}$ is the effective area. Under strong light, the refractive index of the medium is given by the sum of the normal value $N_0$ and an increase proportional to the square of the photoelectric field amplitude E. In particular, the constant of proportion $N_2$ (unit: $m^2/W$) in the second term is referred to as the second-order nonlinear refractive index. Since the distortion of signal light pulse is mainly influenced by the second-order nonlinear refractive index among nonlinear refractive indices, the nonlinear refractive index in this specification mainly refers to the second-order nonlinear refractive index.

Figure 2A:
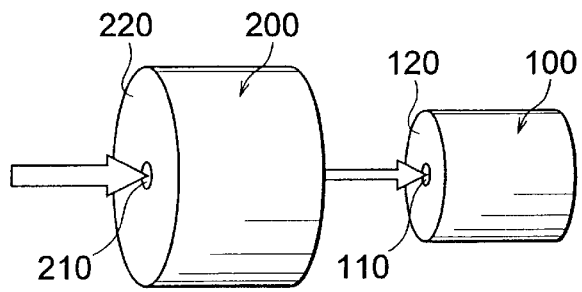
FIG. 2A is a view showing a schematic configuration of an optical transmission line constituted by a single-mode optical fiber and the dispersion-equalizing optical fiber shown in FIG. 1A.
Figure 2B:
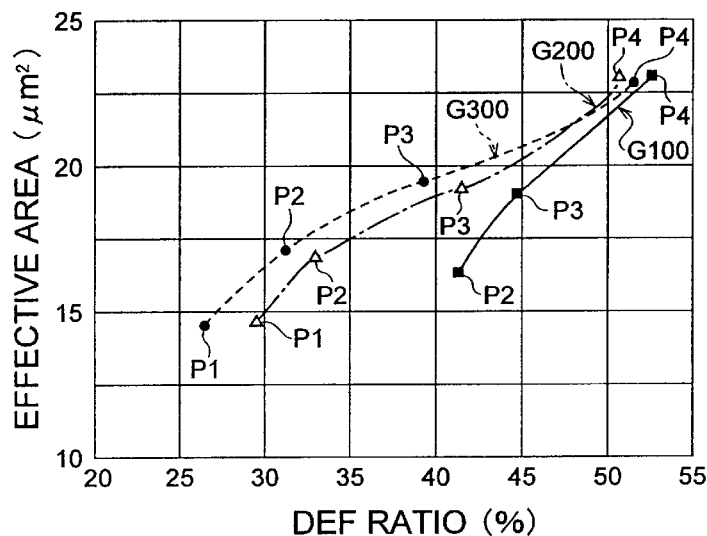
FIG. 2B is a graph showing relationships between the ratio of length of the dispersion-equalizing optical fiber to the total length of the optical transmission line shown in FIG. 2A (DEF ratio) and the effective areas $A_{eff}$ of the dispersion-equalizing optical fiber.
Figure 2C:
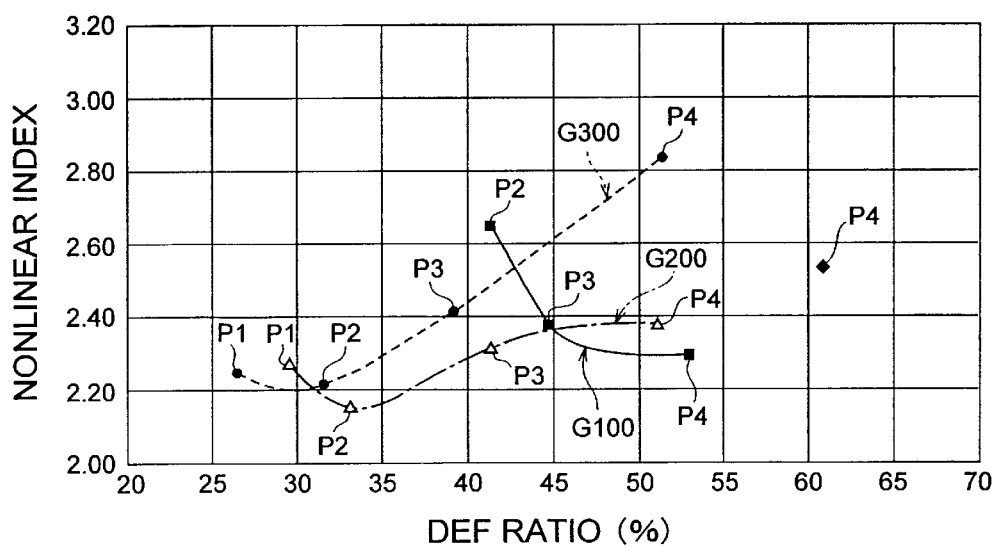
FIG. 2C is a graph showing relationships between the ratio of length of the dispersion-equalizing optical fiber to the total length of the optical transmission line shown in FIG. 2A (DEF ratio) and the nonlinear index of the optical transmission line.
Figure 2D:
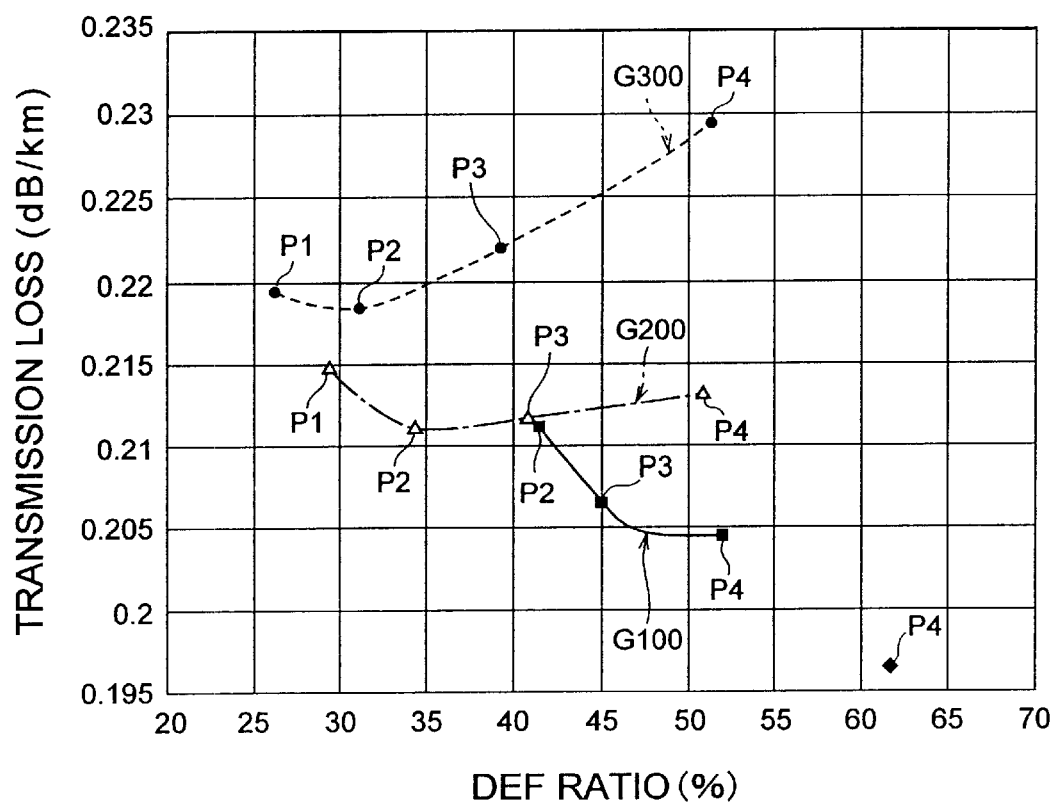
FIG. 2D is a graph showing relationships between the ratio of length of the dispersion-equalizing optical fiber to the total length of the optical transmission line shown in FIG. 2A (DEF ratio) and the transmission loss of the optical transmission line.

FIGS. 2B to 2D are graphs showing the effective area, nonlinear index, and transmission loss, respectively terms of the DEF ratios in optical transmission lines in which, as viewed in the propagating direction of signal light, a single-mode optical fiber 200 is disposed on the upstream side, whereas the dispersion-equalizing optical fiber 100 having the refractive index profile shown in FIG. 1B is disposed on the downstream side, as shown in FIG. 2A. These graphs show the results calculated on the condition that is the dispersion and dispersion slope of the whole transmission lines at 1.55 $\mu$m is 0 ps/nm/km and 0 ps/nm$^2$/km, respectively, and the bending loss measured at a bending diameter of 20 mm is 1 dB/m. Here, the single-mode optical fiber 200 comprises a core 210 and a cladding 220, whereas the cladding 220 may be doped with F element or the like in order to yield a difference in refractive index between the core 210 and the cladding 220. The DEF ratio refers to the ratio of length of the dispersion-equalizing optical fiber 100 to the total length of an optical transmission line, such as that shown in FIG. 2A, constituted by the single-mode optical fiber 200 and the dispersion-equalizing optical fiber 100.

In FIG. 2B, curve G100 indicates the relationship between the DEF ratio and the effective area when $\Delta^+$ is varied while $\Delta^-$ is fixed at −0.5%, curve G200 indicates the relationship between the DEF ratio and the effective area when $\Delta^+$ is varied while $\Delta^-$ is fixed at −0.6%, and curve G300 indicates the relationship between the DEF ratio and the effective area when $\Delta^+$ is varied while $\Delta^-$ is fixed at −0.7%. In FIG. 2C, curve G100 indicates the relationship between the DEF ratio and the nonlinear index when $\Delta^+$ is varied while $\Delta^-$ is fixed at −0.5%, curve G200 indicates the relationship between the DEF ratio and the nonlinear index when $\Delta^+$ is varied while $\Delta^-$ is fixed at −0.6%, and curve G300 indicates the relationship between the DEF ratio and the nonlinear index when $\Delta^+$ is varied while $\Delta^-$ is fixed at −0.7%. Further, in FIG. 2D, curve G100 indicates the relationship between the DEF ratio and the transmission loss when $\Delta^+$ is varied while $\Delta^-$ is fixed at −0.5%, curve G200 indicates the relationship between the DEF ratio and the transmission loss when $\Delta^+$ is varied while $\Delta^-$ is fixed at −0.6%, and curve G300 indicates the relationship between the DEF ratio and the transmission loss when $\Delta^+$ is varied while $\Delta^-$ is fixed at −0.7%. Also, in each of FIGS. 2B to 2D, points P1, P2, P3, and P4 in each of curves G100, G200, and G300 indicate values obtained when $\Delta^+$ is 1.6%, 1.4%, 1.2%, and 1.0%, respectively.

As can be seen from FIG. 2B, the effective area $A_{eff}$ monotonously increases as the DEF ratio becomes greater. On the other hand, as can be seen from FIGS. 2C and 2D, both of nonlinear index and transmission loss attain their minimum values within the range where the DEF ratio is 25% to 40%. In view of these facts, in order to attain a design yielding a smaller nonlinear index, it is necessary for the effective area $A_{eff}$ to be 15 $\mu m^2$ or more, preferably 17 $\mu m2$ or more, further preferably 19 $\mu m^2$ or more.

Also, the inventors prepared samples in which, in the refractive index profile 150 shown in FIG. 1B, the relative refractive index difference $\Delta^+$ of the core region 110 and relative refractive index difference $\Delta^-$ of the inner cladding 121 with reference to the refractive index $n_3$ of the outer cladding 122, the outside diameter 2a of the core region 110, and the ratio Ra (=2a/2b) of the outside diameter 2a of the core region 110 to the outside diameter 2b of the inner cladding 121 were varied; and determined the dispersion D and dispersion slope S in each of these samples by calculation. Examples of the calculated results are shown in FIGS. 3 to 9.

Figure 3:
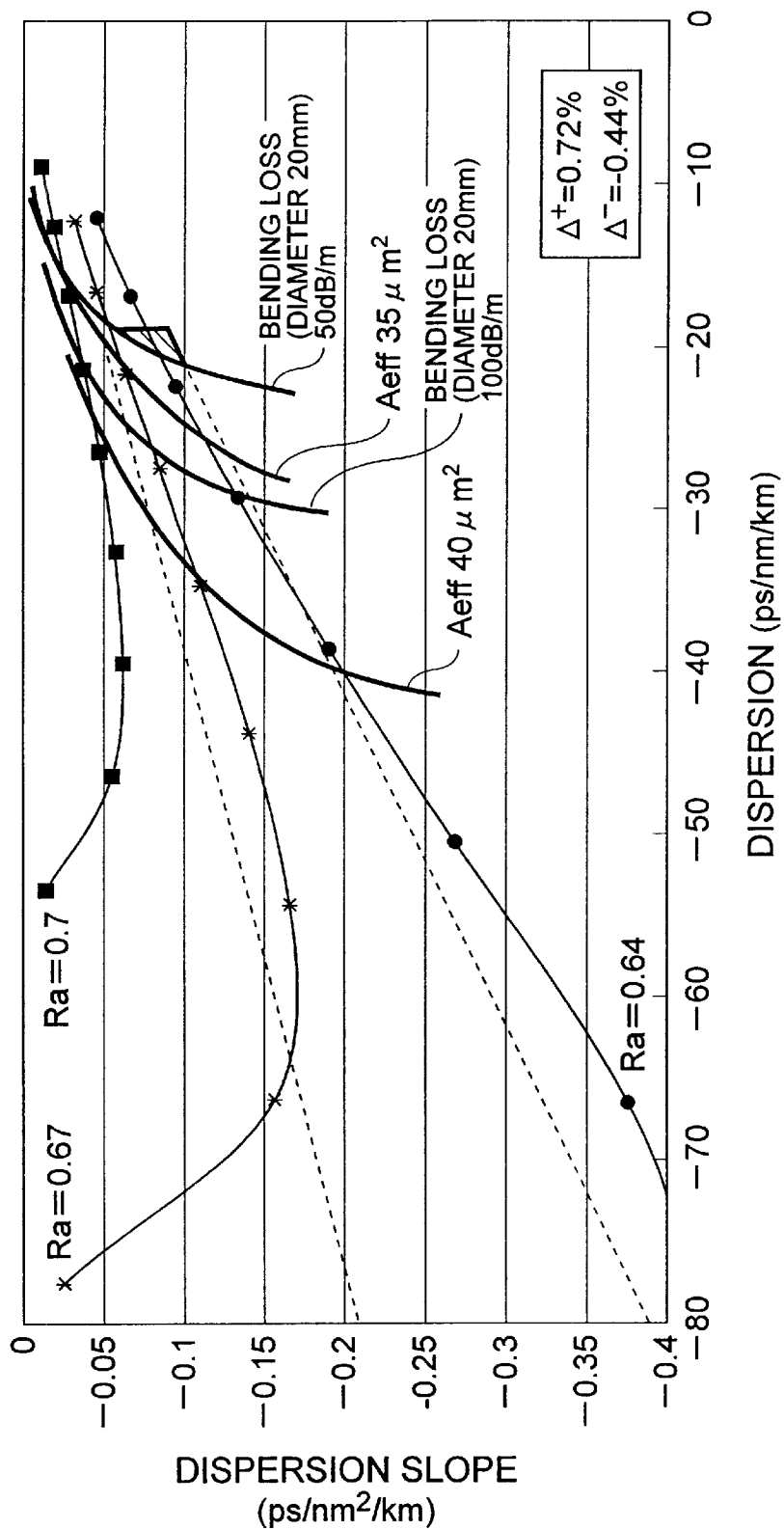
FIG. 3 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 0.72% and −0.44%, respectively.
Figure 4:
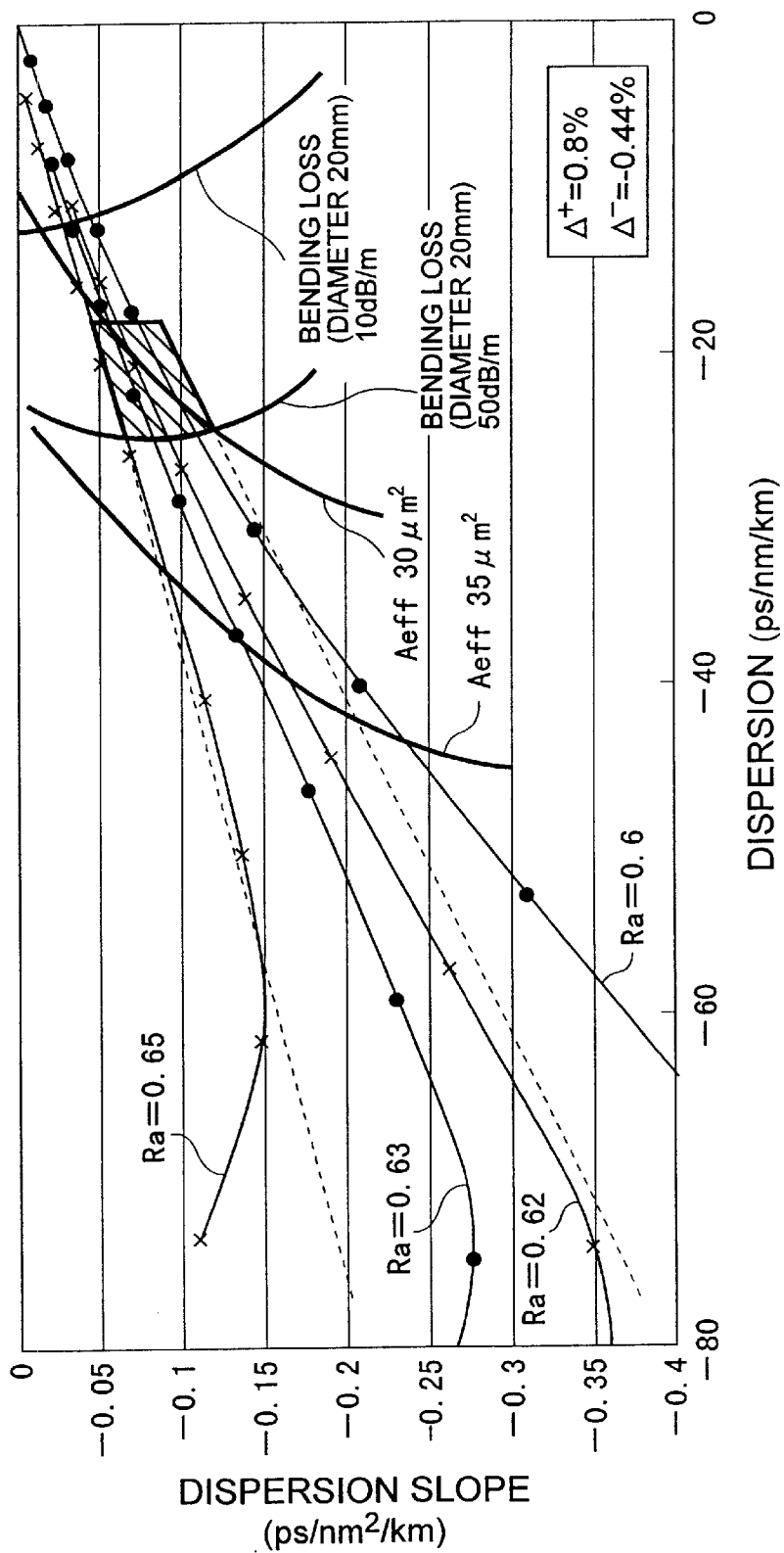
FIG. 4 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 0.8% and −0.44%, respectively.
Figure 5:
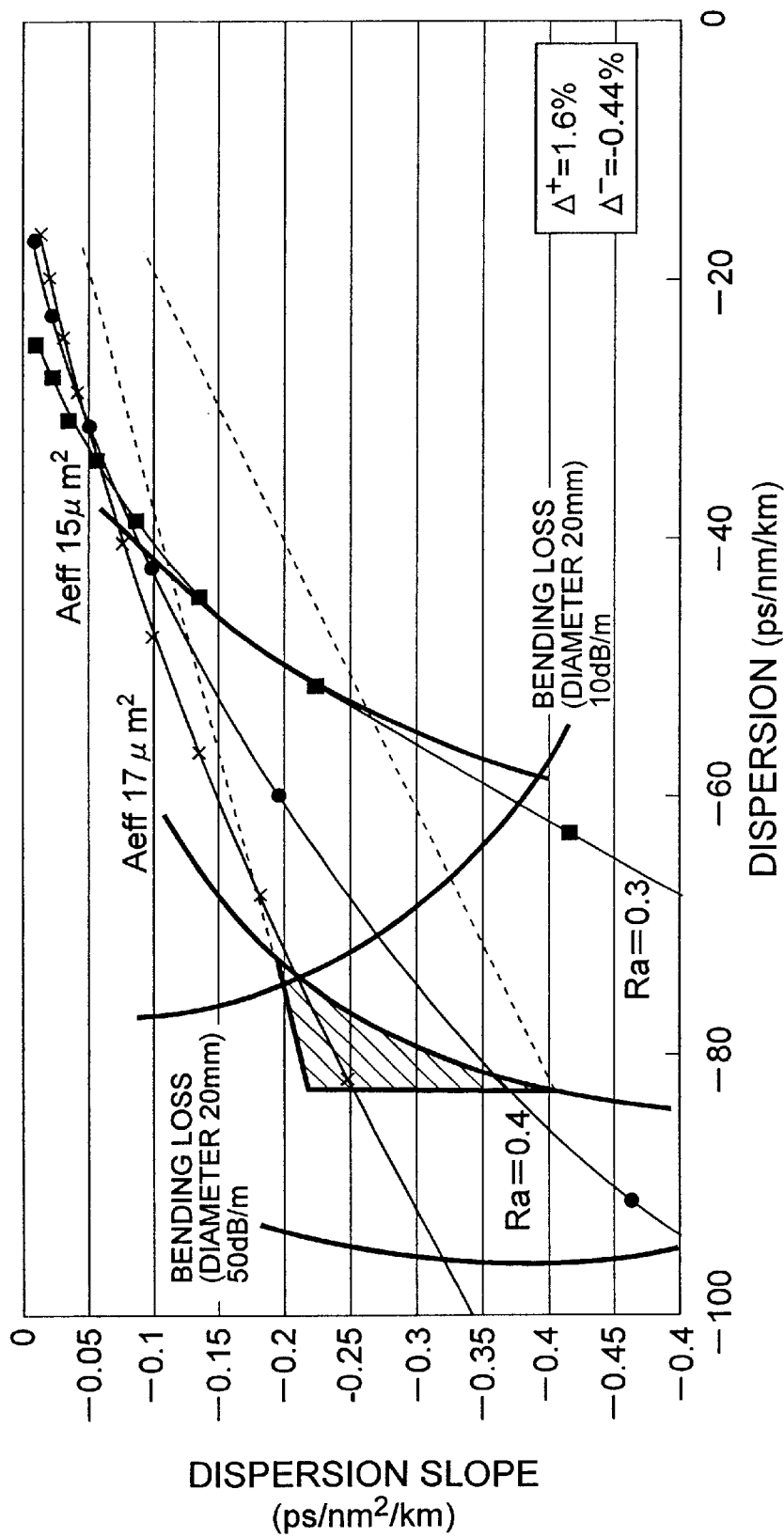
FIG. 5 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference Δ⁺ of the core region and the relative refractive index difference Δ⁻ of the inner cladding with respect to the outer cladding are 1.6% and –0.44%, respectively.
Figure 6:
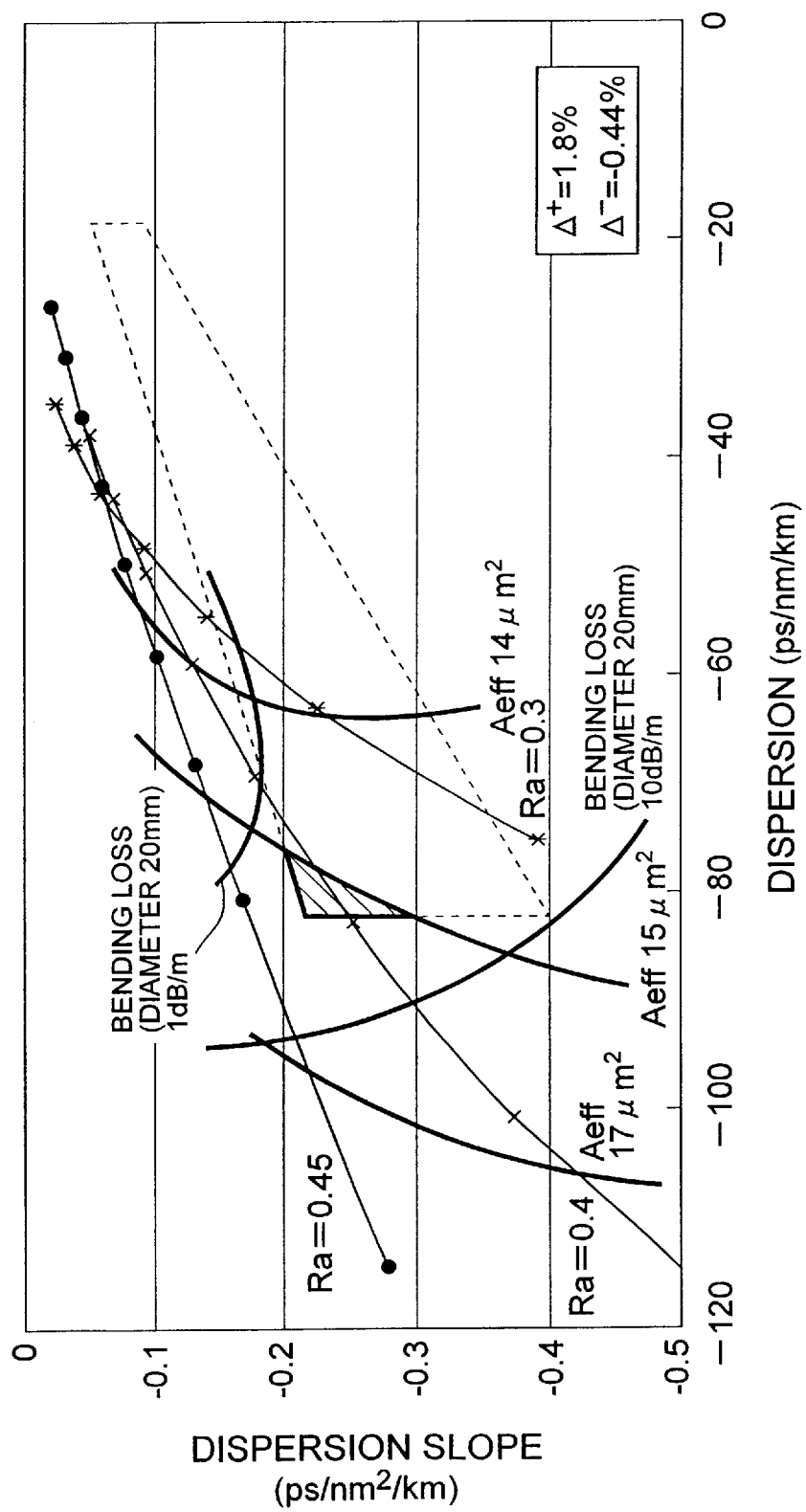
FIG. 6 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference Δ⁺ of the core region and the relative refractive index difference Δ⁻ of the inner cladding with respect to the outer cladding are 1.8% and –0.44%, respectively.
Figure 7:
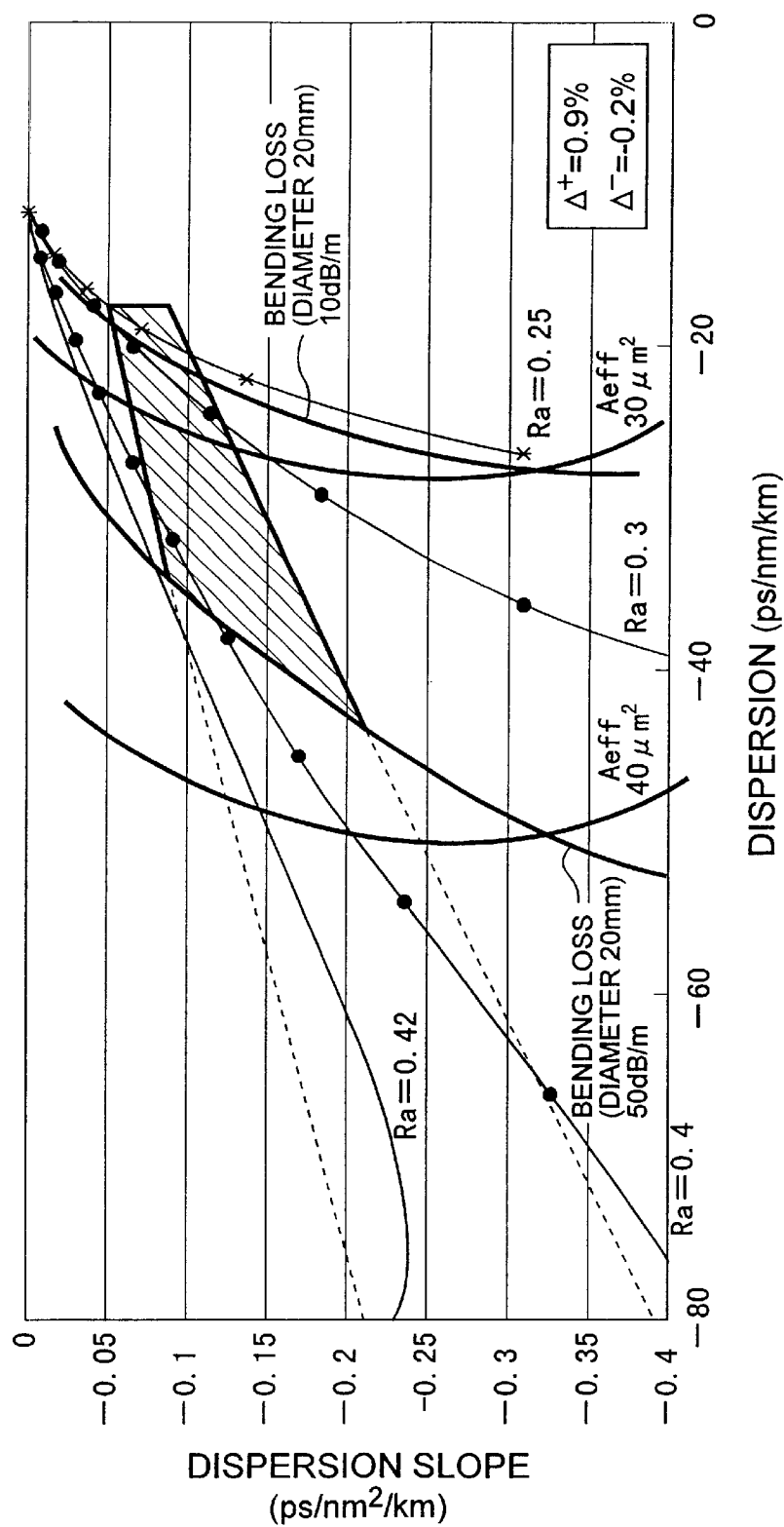
FIG. 7 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference Δ⁺ of the core region and the relative refractive index difference Δ⁻ of the inner cladding with respect to the outer cladding are 0.9% and –0.20%, respectively.
Figure 8:
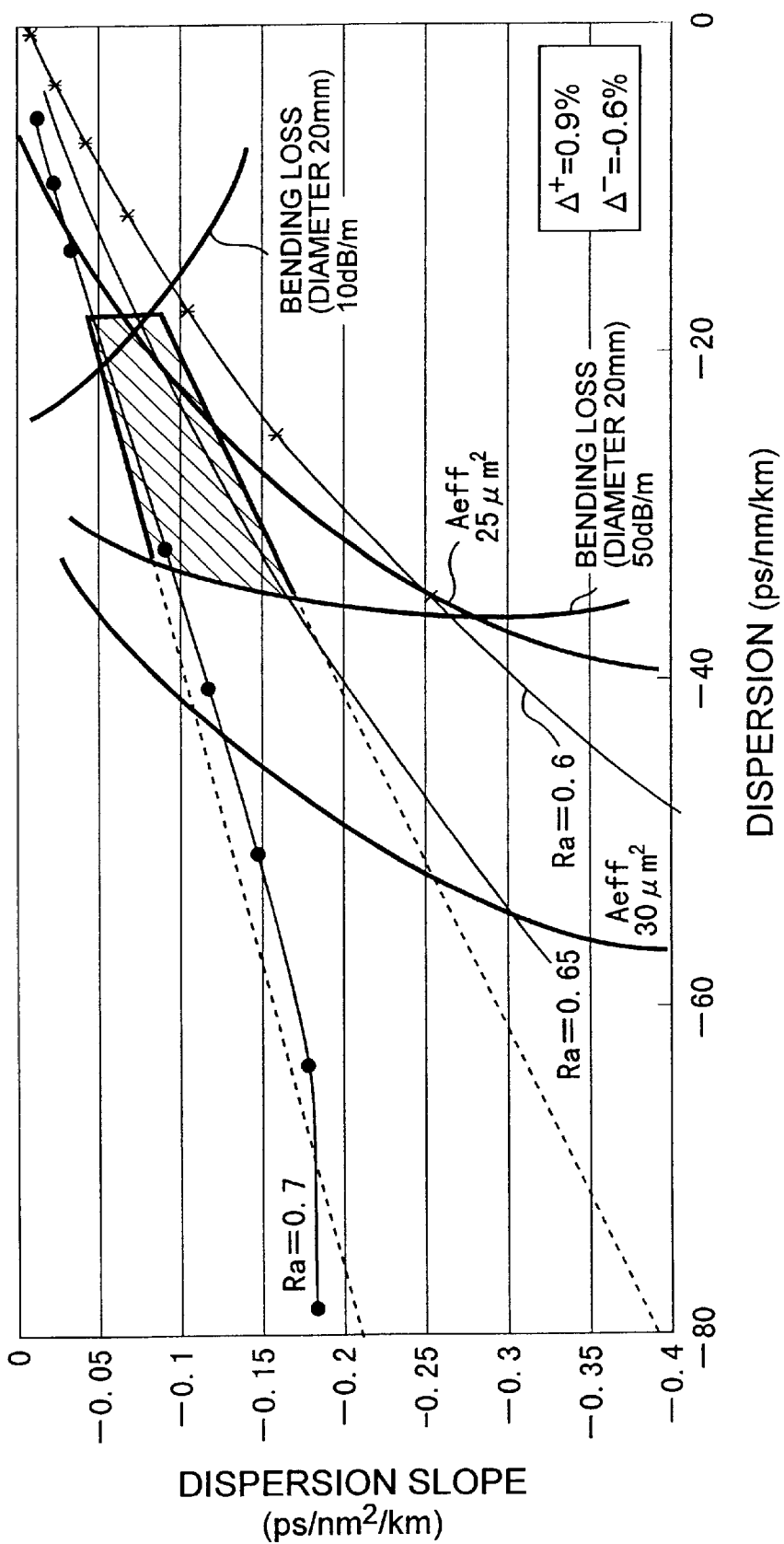
FIG. 8 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference Δ⁺ of the core region and the relative refractive index difference Δ⁻ of the inner cladding with respect to the outer cladding are 0.9% and –0.60%, respectively.
Figure 9:
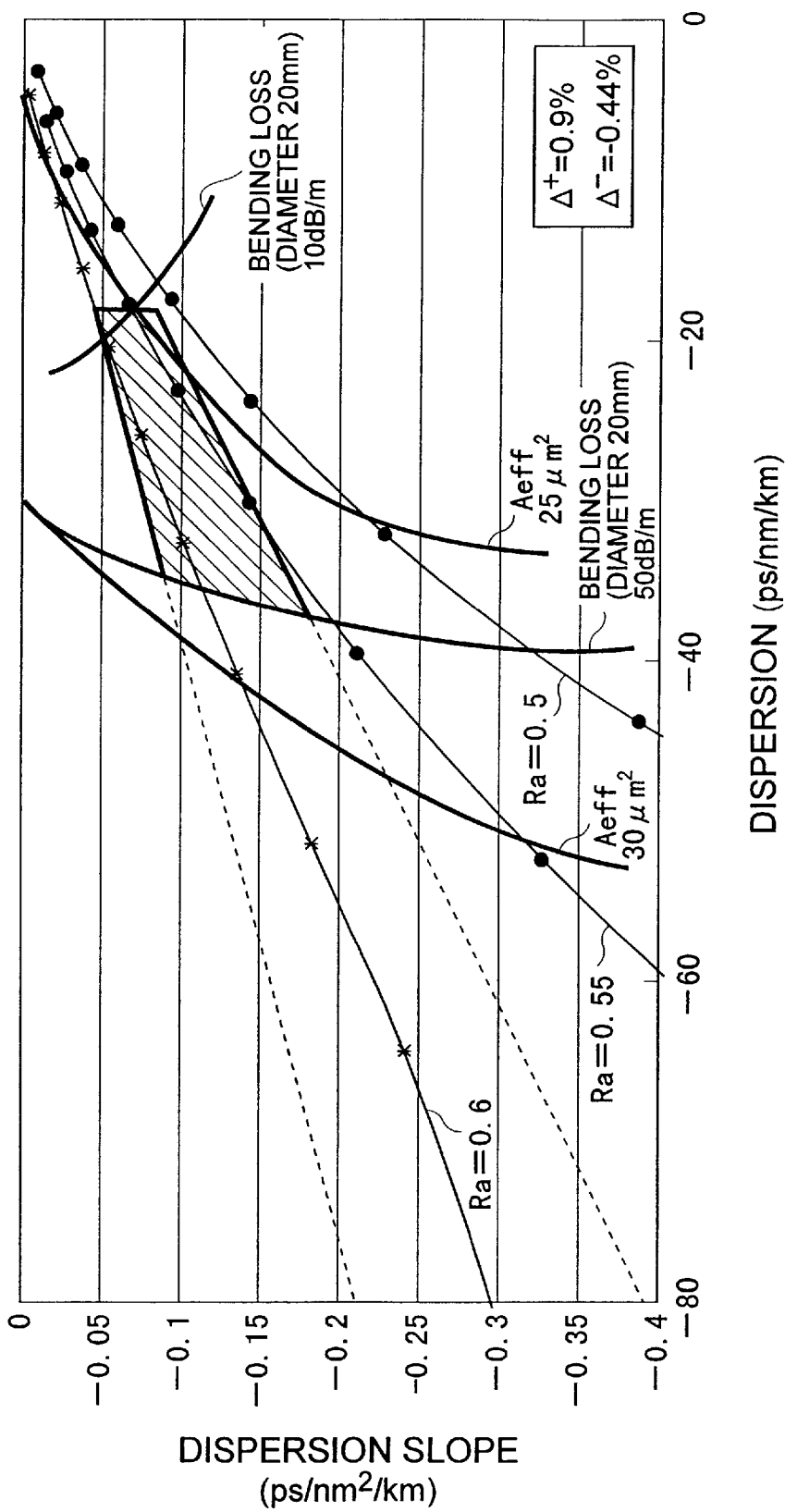
FIG. 9 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference Δ⁺ of the core region and the relative refractive index difference Δ⁻ of the inner cladding with respect to the outer cladding are 0.9% and –0.44%, respectively.

FIGS. 3 to 9 are graphs showing the dispersion D and dispersion slope S for individual values of the outside diameter 2a of the core region 110 and Ra (=2a/2b). FIG. 3 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 0.72% and −0.448% respectively. FIG. 4 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 0.8% and −0.44%, respectively. FIG. 5 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 1.6% and −0.44%, respectively. FIG. 6 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 1.8% and −0.44%, respectively. FIG. 7 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 0.9% and −0.20%, respectively. FIG. 8 is a graph showing the dispersion D and dispersion slope S with respect to individual values of the outside diameter 2a of the core region and the ratio Ra (2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 0.9% and −0.60%, respectively. FIG. 9 is a graph showing the dispersion D and dispersion slope S with respect to individual values of the outside diameter 2a of the core region and the ratio Ra (=2a/2b) of the outside diameter 2a of the core region to the outside diameter 2b of the inner cladding when the relative refractive index difference $\Delta^+$ of the core region and the relative refractive index difference $\Delta^-$ of the inner cladding with respect to the outer cladding are 0.9% and −0.44%, respectively. These graphs also show contour lines indicating the effective area $A_{eff}$ and the bending loss of 50 dB/m at a diameter of 20 mm. Also, the ranges of dispersion D and dispersion slope S satisfying the above-mentioned expressions (3) and (4) are indicated by broken lines.

As can be seen from these graphs, in the case where the relative refractive index difference $\Delta^+$ of the core region 110 with respect to the outer cladding 122 is 0.72% while the relative refractive index difference $\Delta^-$ of the inner cladding 121 with respect to the outer cladding 122 is fixed at −0.44% (FIG. 3), the bending loss becomes 50 dB/m or less in a small area within the ranges of dispersion D and dispersion slope S satisfying the above-mentioned expressions (2) and (3).

In the case where $\Delta^-$=−0.44% and $\Delta^+$=0.8% (FIG. 4), the effective area $A_{eff}$ is 15 $\mu m^2$ or more while the bending loss is 50 dB/m or less in a partial area (hatched area in FIG. 4) within the ranges of dispersion D and dispersion slope S satisfying the above-mentioned expressions (2) and (3). The conditions under which the dispersion D and dispersion slope S are set within this partial area are, for example, Ra=0.63 while 2a=5.67 $\mu m$, Ra=0.60 while 2a=5.64 $\mu m$, and the like.

Also, in the case where $\Delta^-$=−0.44% and $\Delta^+$=1.6% (FIG. 5), the effective area $A_{eff}$ is 15 $\mu m^2$ or more while the bending loss is 50 dB/m or less in a partial area (hatched area in FIG. 5) within the ranges of dispersion D and dispersion slope S satisfying the above-mentioned expressions (2) and (3). The conditions under which the dispersion D and dispersion slope S are set within this partial area are, for example, Ra=0.45 while 2a=3.46 $\mu m$, and the like.

Also, in the case where $\Delta^-$=−0.44% and $\Delta^+$=1.8% (FIG. 6), the effective area $A_{eff}$ is 15 $\mu m^2$ or more while the bending loss is 50 dB/m or less in a partial area (hatched area in FIG. 6) within the ranges of dispersion D and dispersion slope S satisfying the above-mentioned expressions (2) and (3). The conditions under which the dispersion D and dispersion slope S are set within this partial area are, for example, Ra=0.40 while 2a=3.21 $\mu m$, and the like.

In the case where the relative refractive index difference $\Delta^+$ of the core region 110 with respect to the outer cladding 122 is fixed at 0.9% while the relative refractive index difference $\Delta^-$ of the inner cladding 121 with respect to the outer cladding 122 is −0.60% to −0.20% (FIGS. 7 to 9), the effective area $A_{\mathit{eff}}$ is 15 $\mu m^2$ or more while the bending loss is 50 dB/m or less in a partial area (hatched area in each graph) within the ranges of dispersion D and dispersion slope S satisfying the above-mentioned expressions (2) and (3). However, the position and size of this area is not greatly influenced by the relative refractive index difference $\Delta^-$ of the inner cladding 121 with respect to the outer cladding 122. Here, the conditions under which the dispersion D and dispersion slope S are set within this partial area are, for example, Ra=0.40 while 2a=4.40 $\mu$m, and the like in the case where $\Delta^+$=0.9% and $\Delta^-$=−0.20% (FIG. 7). These conditions are Ra=0.65 while 2a=5.72 $\mu$m, and the like in the case where $\Delta^+$=0.9% and $\Delta^-$=−0.60% (FIG. 8). Also, they are Ra=0.55 while 2a=5.28 $\mu$m, Ra=0.60 while 2a=5.16 $\mu$m, and the like in the case where $\Delta$+=0.9% and $\Delta^-$=−0.44% (FIG. 9), for example.

In addition to the above-mentioned examples of calculations, further examples of calculations in which the relative refractive index difference $\Delta^+$ of the core region 110 with respect to the outer cladding 122 and the relative refractive index difference $\Delta^-$ of the inner cladding 121 with respect to the outer cladding 122 are varied have clarified that the effective area is 17 $\mu m^2$ or more while the bending loss at a diameter of 20 mm is 50 dB/m or less if $\Delta^+$ is 0.72% or more but 1.6% or less within the ranges where the dispersion D and dispersion slope S satisfy the above-mentioned expressions (2) and (3). Further, it has been found that, when $\Delta^+$ is 0.72% or more but 1.8% or less, the effective area is 15 $\mu m^2$ or more while the bending loss at a diameter of 20 mm is 50 dB/m or less.

Here, as mentioned above, FIGS. 5, 6, and 9 are graphs showing the dispersion D and dispersion slope S with respect to the outside diameter 2a of the core region 110 and Ra (=2a/2b), in which FIG. 5 indicates the case where $\Delta^+$=1.6% and $\Delta^-$=−0.44%, FIG. 6 indicates the case where $\Delta^+$=1.8% and $\Delta^-$=−0.44%, and FIG. 9 indicates the case where $\Delta^+$=0.9% and $\Delta^-$=−0.44%. These graphs show not only individual contour lines of the effective area $A_{\mathit{eff}}$ and the bending loss of 50 dB/m at a diameter of 20 mm but also the contour line of bending loss of 10 dB/m at a diameter of 20 mm. Also, the ranges of dispersion D and dispersion slope S satisfying the above-mentioned expressions (2) and (3) are indicated by broken lines.

As can be seen from these graphs, in the respective cases where $\Delta^+$ is 0.9%, 1.6%, and 1.8% while $\Delta^-$ is fixed at −0.44% (FIGS. 5, 6, and 9), the effective area $A_{\mathit{eff}}$ is 15 $\mu m^2$ or more while the bending loss is 10 dB/m or less in a partial area (hatched area in each graph) within the ranges of dispersion D and dispersion slope S satisfying the above-mentioned expressions (2) and (3). The conditions under which the dispersion D and dispersion slope S are set within this partial area are, for example, Ra=0.45 while 2a=3.46 $\mu$m, and the like in the case where $\Delta^+$=1.6% and $\Delta^-$=−0.44% (FIG. 5); Ra=0.40 while 2a=3.21 $\mu$m, and the like in the case where $\Delta^+$=1.8% and $\Delta^-$=−0.44% (FIG. 6); and Ra=0.60 while 2a=5.43 $\mu$m, and the like in the case where $\Delta^+$=0.9% and $\Delta^-$=−0.44% (FIG. 9).

In calculations in which the settings of $\Delta^+$ and $\Delta^-$ are varied, if $\Delta^+$ is 0.9% or more but 1.6% or less within the ranges of dispersion D and dispersion slope S satisfying the above-mentioned expressions (2) and (3), then the effective area is 17 $\mu m^2$ or more while the bending loss at a diameter of 20 mm is 10 dB/m or less. Also, if $\Delta^+$ is 0.9% or more but 1.8% or less, then the effective area becomes 15 $\mu m^2$ or more while the bending loss at a diameter of 20 mm is 10 dB/m or less. Consequently, setting $\Delta^+$ within this range is preferable in that the bending loss at a diameter of 20 mm becomes 10 dB/m or less.

Figure 10A:
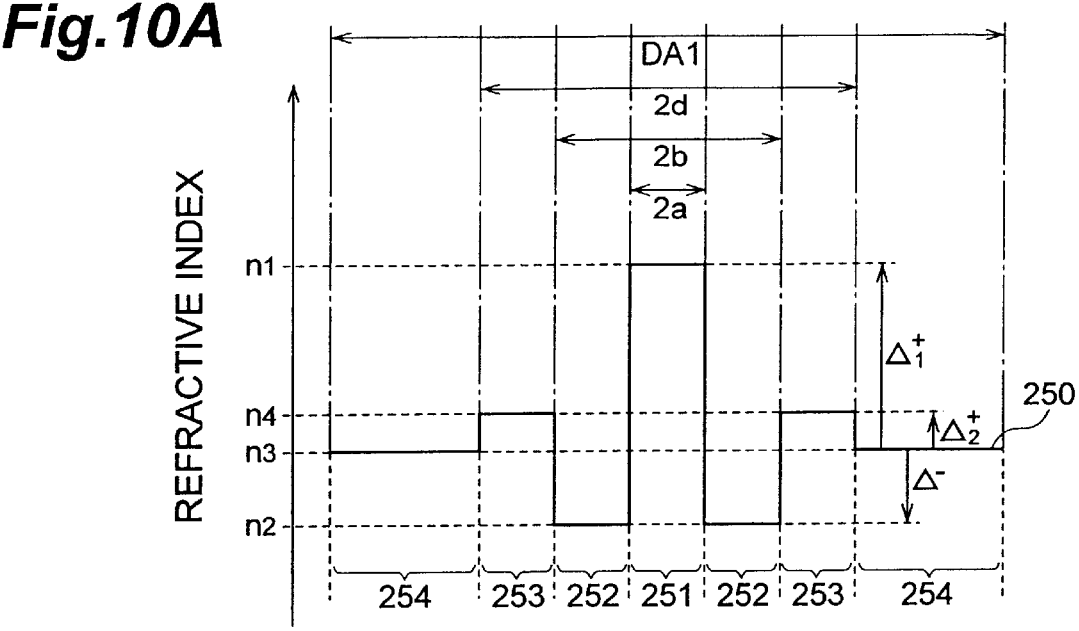
Figure 10B:
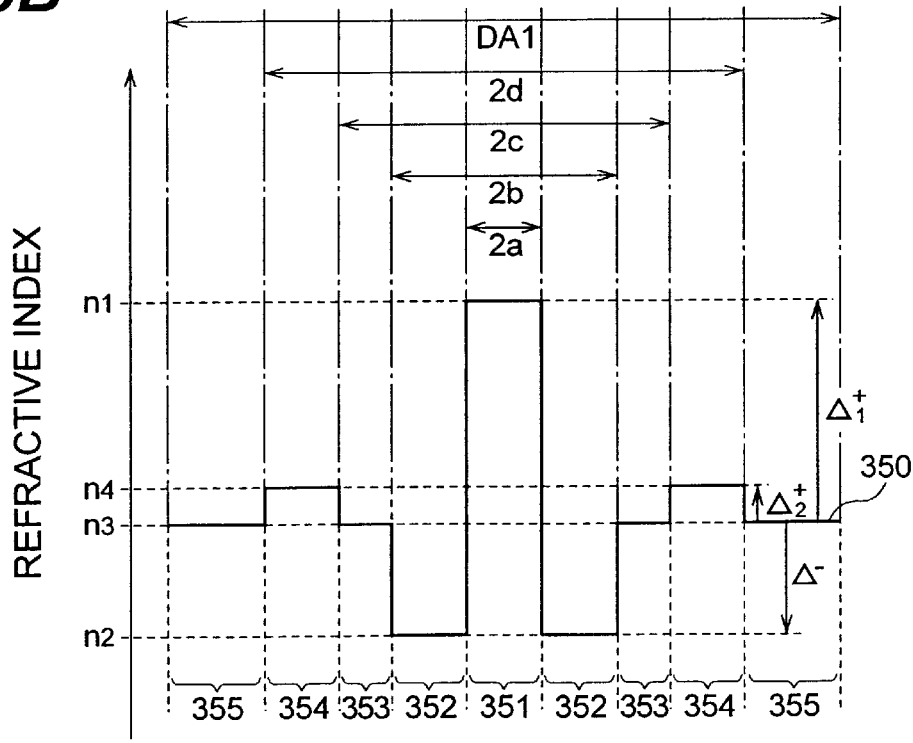
FIG. 10B is a chart showing the refractive index profile of a third embodiment of the dispersion-equalizing optical fiber according to the present invention.

Though the foregoing explanations relate to the dispersion-equalizing optical fiber having the refractive index profile 150 shown in FIG. 1B as the first embodiment of the dispersion-equalizing optical fiber according to the present invention, the refractive index profile of the dispersion-equalizing optical fiber according to the present invention is not limited to that shown in FIG. 1B. For example, one or more intermediate claddings may be disposed between the inner cladding 121 and the outer cladding 122 in the cladding region 120. FIGS. 10A and 10B show the respective refractive index profiles of second and third embodiments of the dispersion-equalizing optical fiber according to the present invention. The refractive index profile 250 of the second embodiment shown in FIG. 10A comprises a depressed cladding structure. In the dispersion-equalizing optical fiber having this refractive index profile 250, with reference to the cross-sectional structure of FIG. 1A, an intermediate cladding having a refractive index higher than that of the outer cladding 122 but lower than that of the core region 110 is disposed in direct contact with the outer periphery of the inner cladding 121. The refractive index profile 350 of the third embodiment shown in FIG. 10B comprises a depressed cladding structure. In the dispersion-equalizing optical fiber having this refractive index profile 350, an intermediate cladding having a refractive index substantially identical to that of the outer cladding 122 is further disposed between the inner cladding 121 and the intermediate cladding in the second embodiment.

The abscissa of the refractive index profile 250 shown in FIG. 10A corresponds to individual positions along the line L in FIG. 1A on a cross section perpendicular to the center axis of the core region 110. In the refractive index profile 250 of FIG. 10A, with reference to FIG. 1A, regions 251, 252, 253, and 254 indicate the respective refractive indices at individual positions on the line L of the core region 110, inner cladding 121, intermediate cladding disposed between the inner cladding 121 and the outer cladding 122, and outer cladding 122.

Therefore, the dispersion-equalizing optical fiber according to the second embodiment having the refractive index profile 250 of such a depressed cladding structure comprises a core region having a refractive index $n_1$, and an outside diameter 2a; an inner cladding which is a region disposed on the outer periphery of the core region and has an outside diameter 2b and a refractive index $n_2$ (<$n_1$); an intermediate cladding which is a region disposed on the outer periphery of the inner cladding and has an outside diameter 2d and a refractive index $n_4$ (<$n_1$, >$n_2$); and an outer cladding which is a region disposed on the outer periphery of the intermediate cladding and has an outside diameter (corresponding to the fiber diameter) DA1 and a refractive index $n_3$ (<$n_4$, >$n_2$). A coating layer is also disposed on the outer periphery of the outer cladding in the dispersion-equalizing optical fiber according to the second embodiment.

In the dispersion-equalizing optical fiber according to the second embodiment, when 2a=4.98 $\mu$m, 2a/2b=0.52, 2b/2d= 0.27, $\Delta_1^+$=1.0%, $\Delta^-$=−0.3%, and $\Delta_2^+$=0.07%, for example, its dispersion and dispersion slope are −27 ps/nm/km and −0.1 ps/nm²/km, respectively, at a wavelength of 1.55 $\mu$m, thus satisfying the above-mentioned expressions (2) and (3). Also, at a wavelength of 1.55 $\mu$m, the bending loss at a diameter of 20 mm is 0.41 dB/m, whereas the effective area is 25.94 $\mu m^2$.

The abscissa of the refractive index profile 350 shown in FIG. 10B corresponds to individual positions along the line L in FIG. 1A on a cross section perpendicular to the center axis of the core region 110. Therefore, in the refractive index profile 350 of FIG. 10B, with reference to FIG. 1A again in the third embodiment, regions 351, 352, 353, 354, and 355 indicate the respective refractive indices at individual positions on the line L of the core region 110, inner cladding 121, first intermediate cladding disposed between the inner cladding 121 and the outer cladding 122, second intermediate cladding disposed between the first intermediate cladding and the outer cladding 122, and outer cladding 122.

Therefore, the dispersion-equalizing optical fiber according to the third embodiment having the refractive index profile 350 of such a depressed cladding structure comprises a core region having a refractive index $n_1$ and an outside diameter $2a$; an inner cladding which is a region disposed on the outer periphery of the core region and has an outside diameter $2b$ and a refractive index $n_2$ ($<n_1$); a first intermediate cladding which is a region disposed on the outer periphery of the inner cladding and has an outside diameter $2c$ and a refractive index $n_3$ ($<n_1$, $>n_2$); a second intermediate cladding which is a region disposed on the outer periphery of the first intermediate cladding and has a refractive index $n_4$ ($<n_1$, $>n_3$); and an outer cladding which is a region disposed on the outer periphery of the second intermediate cladding and has an outside diameter (corresponding to the fiber diameter) DA1 and the refractive index $n_3$. A coating layer is also disposed on the outer periphery of the outer cladding in the dispersion-equalizing optical fiber according to the third embodiment.

In the dispersion-equalizing optical fiber according to the third embodiment, when $2a$=5.04 $\mu$m, $2a/2b$=0.52, $2b/2c$=0.675, $2c/2d$=0.40, $\Delta_1^+$=1.0%, $\Delta^-$=−0.3%, and $\Delta_2^+$=0.07%, for example, its dispersion and dispersion slope are −22 ps/nm/km and −0.08 ps/nm$^2$/km, respectively, at a wavelength of 1.55 $\mu$m, thus satisfying the above-mentioned expressions (2) and (3). Also, at the wavelength of 1.55 $\mu$m, the bending loss at a diameter of 20 mm is 0.21 dB/m, whereas the effective area is 24.63 $\mu$m$^2$.

In the basic refractive index profile 150 shown in FIG. 1B, the bending loss at 20 mm cannot become 1 dB/m or less while the effective area is near 25 $\mu$m$^2$ in the case where the dispersion D and dispersion slope S satisfy the above-mentioned expressions (2) and (3). However, this condition can be realized in the refractive index profiles 250, 350 having one or more intermediate claddings as shown in FIGS. 10A and 10B. Thus, the refractive index profiles 250, 350 having a depressed cladding structure as shown in FIGS. 10A and 10B are preferable to the refractive index profile 150 shown in FIG. 1B in that they can reduce the bending loss more effectively.

On the other hand, a single-mode optical fiber disposed on the upstream side and having a zero-dispersion wavelength within the range of 1.25 $\mu$m to 1.45 $\mu$m.

Figure 11A:
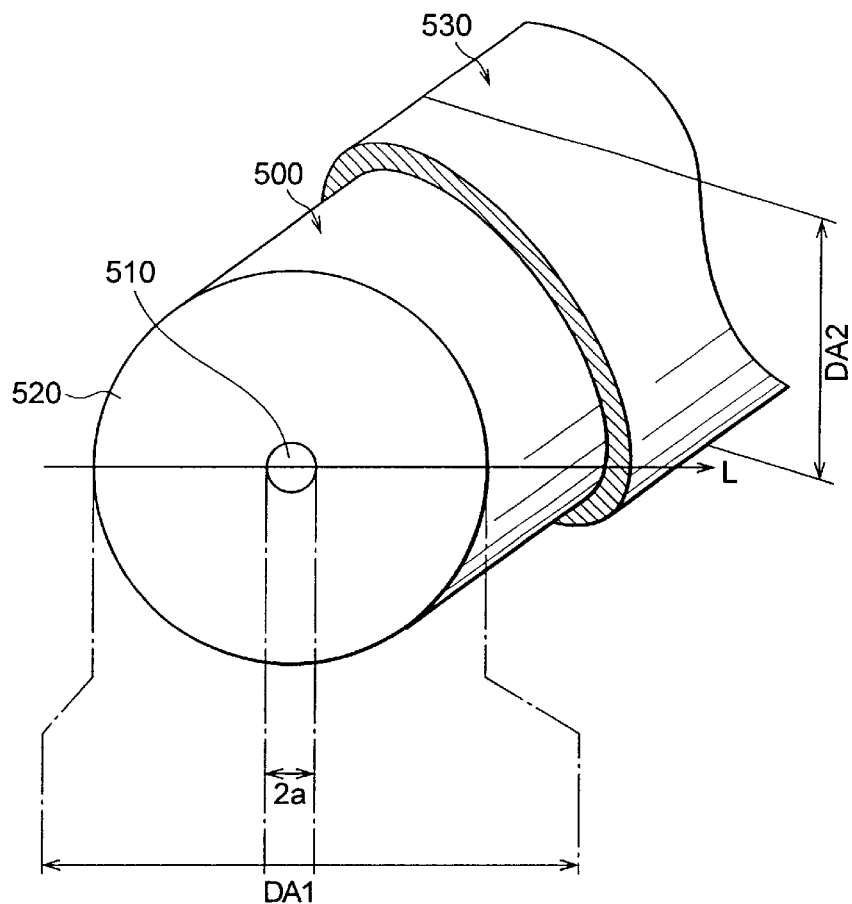
Figure 11B:
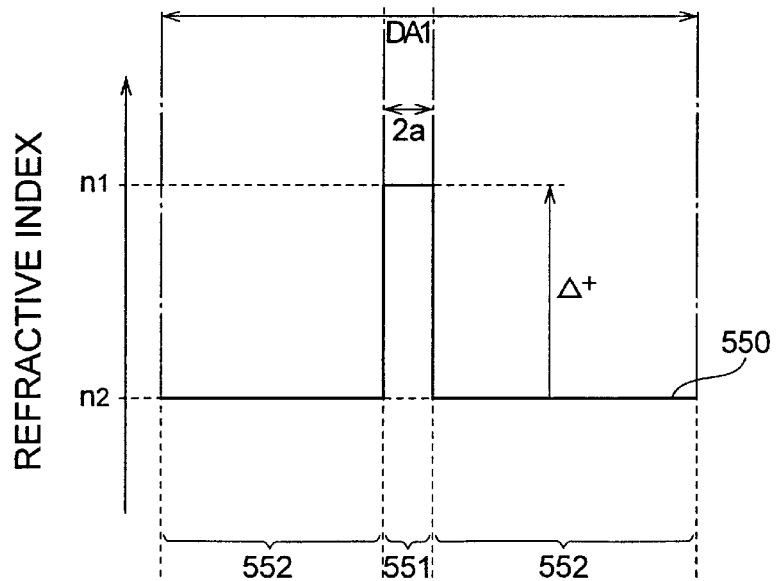
FIG. 11B is a chart showing a refractive index profile of the single-mode optical fiber shown in FIG. 11A.

FIG. 11A is a view showing a cross-sectional structure of a first embodiment of the single-mode optical fiber disposed on the upstream side of the optical transmission line, whereas FIG. 11B is a refractive index profile of the single-mode optical fiber according to the first embodiment shown in FIG. 11A.

As shown in FIG. 11A, the single-mode optical fiber 500 according to the first embodiment is a single-mode optical fiber, mainly composed of silica glass, having a diameter (fiber diameter) DA1, whereas a coating layer 530 having an outside diameter DA2 is disposed on the outer periphery thereof. This single-mode optical fiber 500 comprises a core region 510 which is a region extending along a predetermined axis and having a refractive index $n_1$ and an outside diameter $2a$; and a cladding region 520 which is a region, disposed on the outer periphery of the core region 510, having a refractive index $n_2$ lower than that of the core region 510.

The abscissa of the refractive index profile 550 shown in FIG. 11B corresponds to individual positions along the line L in FIG. 11A on a cross section perpendicular to the center axis of the core region 510. Therefore, in the refractive index profile 550 of FIG. 11B, regions 551 and 552 indicate the respective refractive indices at individual positions on the line L of the core region 510 and cladding region 520.

When the outside diameter $2a$ of the core region is 6.4 $\mu$m while the relative refractive index difference $\Delta^+$ (=$(n_1-n_2)/n_2$) is 0.35%, the optical fiber according to the first embodiment has a zero-dispersion wavelength at 1346 nm and exhibits the following characteristics with respect to light having a wavelength of 1.55 $\mu$m. The effective cutoff wavelength of the single-mode optical fiber according to the first embodiment is 1162 nm.

dispersion (ps/nm/km): 11.64 dispersion slope (ps/nm$^2$/km): 0.0689 mode field diameter (MFD; $\mu$m): 8.46 effective area $A_{eff}$ ($\mu$m$^2$): 54.1 bending loss at a diameter of 20 mm (dB/m): 0.77

In the optical fiber having a depressed cladding structure, as can be seen from FIGS. 2B to 2D mentioned above, in order for its transmission loss to be on a par with that of a dispersion-shifted optical fiber (0.210 dB/km) or less, its effective area $A_{eff}$ is required to be 19 $\mu$m$^2$ or more when the relative refractive index difference $\Delta^-$ of the inner cladding with respect to the outer cladding is −0.5%. Namely, in order for the transmission loss to become 0.210 dB/km or less in curve G100 ($\Delta^-$=−0.5%) in FIG. 2D, it is preferred that the DEF ratio be 45% or more. In view of graph G100 in FIG. 2B, on the other hand, its effective area $A_{eff}$ becomes 19 $\mu$m$^2$ or more within the range where the DEF ratio is 45% or more.

A fourth embodiment of the dispersion-equalizing optical fiber according to the present invention has a cross-sectional structure similar to that shown in FIG. 1A and a refractive index profile similar to that shown in FIG. 1B. However, the dispersion-equalizing optical fiber according to the fourth embodiment has a depressed cladding structure comprising a core having an outside diameter of 4.6 $\mu$m and a refractive index $n_1$, an inner cladding which is disposed on the outer periphery of the core and has an outside diameter of 4.6 $\mu$m and a refractive index $n_2$ ($<n_1$), and an outer cladding which is disposed on the outer periphery of the inner cladding and has a refractive index $n_3$ ($>n_2$). When the relative refractive index difference $\Delta^+$ of the core with respect to the outer cladding is 1.2% while the relative refractive index difference $\Delta^-$ of the inner cladding with respect to the outer cladding is −0.5%, the dispersion-equalizing optical fiber according to the fourth embodiment exhibits the following characteristics with respect to light having a wavelength of 1.55 $\mu$m:

dispersion (ps/nm/km): −26.9 dispersion slope (ps/nm$^2$/km): −0.077 mode field diameter (MFD; $\mu$m): 5.0 effective area $A_{eff}$ ($\mu$m$^2$): 19.1 bending loss at a diameter of 20 mm (dB/m): 0.8

In the case of an optical fiber having a simple structure such as that shown in FIG. 11A, which comprises a core, a cladding disposed on the outer periphery of the core, and a coating layer disposed on the outer periphery of the cladding, the amount of increase α of microbend loss, which is one kind of bending loss, is given by the following expression (6):

$$\alpha = (1/\Delta^3) \cdot (a^4/b^4) \cdot (1/D^2) \cdot (E_P^2/E_F^2) \tag{6}$$

where Δ is the relative refractive index difference between the core and the cladding, a is the outside diameter of the core, b is the outside diameter of the cladding, D is the outside diameter of the coating layer, $E_P$ is the Young's modulus of the coating layer material (plastic), and $E_F$ is the Young's modulus of the fiber material.

As can be seen from the above-mentioned expression (6), increases in outside diameter of the coating layer contribute to reducing the microbend loss. FIG. 12 is a graph showing relationships between the effective area and the bending loss in optical fibers in which the outside diameter of the coating layer is varied. In this graph, G400 indicates the result of measurement of a sample in which a coating layer having an outside diameter of 400 μm is disposed on the outer periphery of a single-mode optical fiber having a fiber diameter of 125 μm, whereas G500 indicates the result of measurement of a sample in which a coating layer having an outside diameter of 500 μm is disposed on the outer periphery of the single-mode optical fiber having a fiber diameter of 125 μm. As can be seen from this graph, when the outside diameter of the coating layer is within the range from 235 μm to 415 μm, the bending loss can be reduced to a desirable value or less while a sufficient flexibility is secured.

The bending loss can be reduced not only by adjusting the outside diameter of the coating layer as mentioned above, but also by enhancing the fiber diameter. FIG. 13A is a table listing manufacturing parameters of four samples which are substantially identical to each other in terms of mode field diameter (MFD; μm), effective area $A_{eff}$ (μm²), chromatic dispersion D (ps/nm/km), and cutoff wavelength $\lambda_c$ (μm) as various characteristics with respect to light having a wavelength of 1.55 μm. Here, the respective fiber diameters of prepared samples 1, 2, 3, and 4 are 125.1 μm, 139.8 μm, 150.4 μm, and 160.2 μm. FIG. 13B is a graph showing the relationship between the fiber diameter and bending loss concerning the samples 1 to 4 shown in FIG. 13A. As can be seen from FIG. 13B, the bending loss decreases as the fiber diameter increases. For securing a sufficient flexibility, however, it is preferred that the upper limit of the fiber diameter be 200 μm or less. The above-mentioned adjustment of the outside diameter of the coating layer and the adjustment of the fiber diameter may be carried out either selectively or in combination. Therefore, when reducing the bending loss by increasing the outside diameter of the coating layer, a desirable reducing effect can be obtained even if the fiber diameter is decreased, whereby it will be sufficient if the fiber diameter is 115 μm or more.

Figure 14:
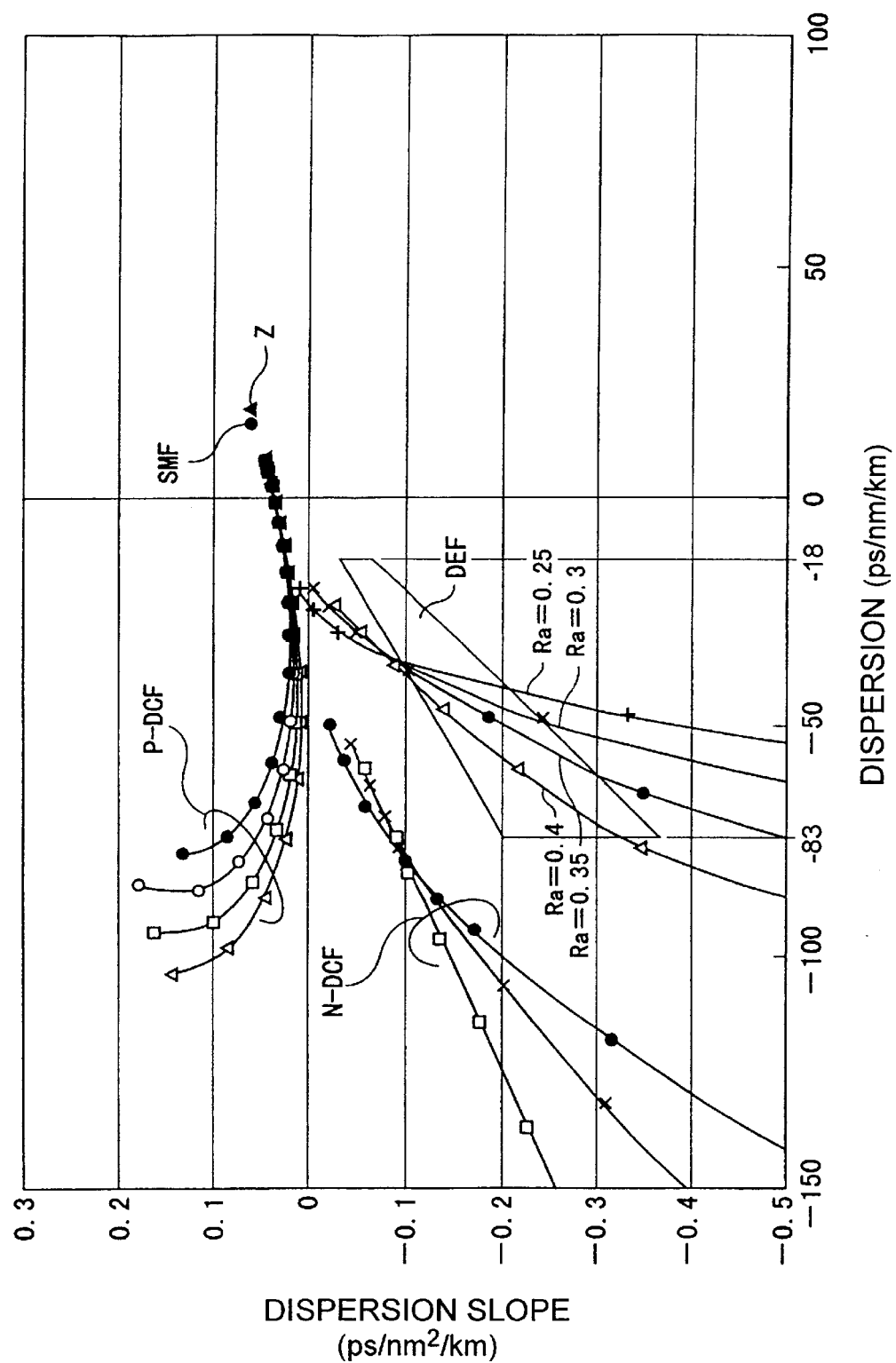
FIG. 14 is a graph showing the dispersion and dispersion slope concerning each of a dispersion-equalizing optical fiber according to the present invention, single-mode optical fibers, and dispersion-compensating optical fibers.

FIG. 14 is a graph showing examples of relationship between the dispersion and the dispersion slope concerning a dispersion-equalizing optical fiber according to the present invention, typical single-mode optical fibers having a zero-dispersion wavelength in a 1.3-μm wavelength band, and dispersion-compensating optical fibers. In the graph, the area referred to as DEF indicates the ranges of dispersion and dispersion slope in the dispersion-equalizing optical fiber according to the present invention. The point referred to as SMF indicates the relationship between the dispersion and dispersion slope in a single-mode optical fiber having a zero-dispersion wavelength in the 1.3-μm wavelength band. The point referred to as Z indicates the relationship between the dispersion and dispersion slope in a single-mode optical fiber having a zero-dispersion wavelength in the 1.3-μm wavelength band, in which a cladding mainly composed of silica glass is doped with F element. P-DCF indicates examples of relationship between the dispersion and dispersion slope in a dispersion-compensating optical fiber having a positive dispersion slope at the wavelength of 1.55 μm. Also, N-DCF indicates examples of relationship between the dispersion and dispersion slope in a dispersion-compensating optical fiber having a negative dispersion slope at the wavelength of 1.55 μm.

The dispersion-compensating optical fiber having a positive dispersion slope at the wavelength of 1.55 μm (P-DCF), for example, comprises a core region having an outside diameter of 2 μm and a cladding region disposed on the outer periphery of the core region, in which the relative refractive index differences of the core region and cladding region with reference to pure silica are 2% and −0.35%, respectively. On the other hand, the dispersion-compensating optical fiber having a negative dispersion slope at the wavelength of 1.55 μm (N-DCF), for example, comprises the structure shown in FIG. 1A, in which the ratio Ra (=2a/2b) of the outside diameter 2a of the core region to the outside diameter 2b of the inner cladding is 0.35, whereas the relative refractive index difference $\Delta^+$ of the core region and the relative refractive index difference $\Delta^-$ of the inner cladding region with respect to the outer cladding are 2.5% and −0.44%, respectively. Further, the dispersion-equalizing optical fiber (DEF) shown in this graph has the structure shown in FIG. 1A, in which the relative refractive index difference $\Delta^+$ of the core region and the relative refractive index difference $\Delta^-$ of the inner cladding region with respect to the outer cladding are 1.2% and −0.44%, respectively.

As shown in FIG. 14, the ranges of dispersion and dispersion slope in the dispersion-equalizing optical fiber (DEF) according to this embodiment are totally different from those in each of the single-mode optical fibers (SMF, Z) and dispersion-compensating optical fibers (P-DCF, N-DCF). On the other hand, while this dispersion-equalizing optical fiber (DEF) and the dispersion-compensating optical fiber having a negative dispersion slope at the wavelength of 1.55 μm (N-DCF) are common to each other in that both the dispersion and dispersion slope are negative, their ranges of dispersion and dispersion slope totally differ from each other. Also, the respective polarities of the dispersion and dispersion slope in the dispersion-equalizing optical fiber (DEF) are opposite to those of the dispersion and dispersion slope in the single mode optical fibers (SMF, Z), whereas their ratios of the dispersion slope S to the dispersion D (S/D) are on a par with each other.

Figure 15A:
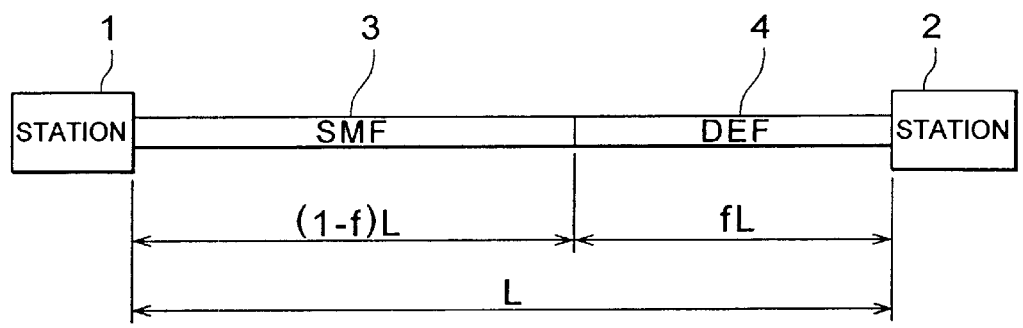
Figure 15B:
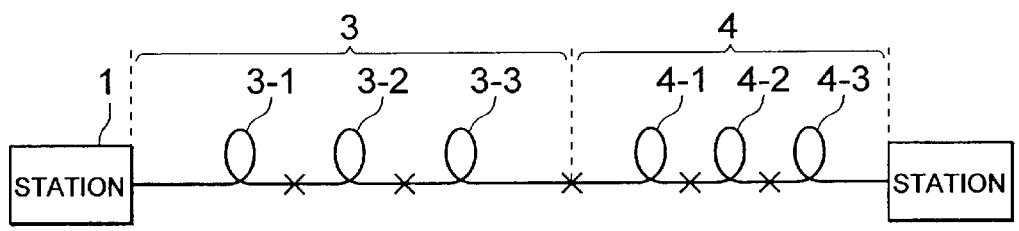
FIG. 15B is a view showing the configuration of a second embodiment of the optical transmission line according to the present invention.

Embodiments of the optical transmission line according to the present invention will now be explained with reference to FIGS. 15A and 15B, respectively. FIG. 15A is a view showing the configuration of the optical transmission line according to a first embodiment. The optical transmission line according to the first embodiment is laid between stations 1 and 2; and comprises a typical single-mode optical fiber 3 having a zero-dispersion wavelength in a 1.3-μm wavelength band, and a dispersion-equalizing optical fiber 4, optically connected to the single-mode optical fiber 3, having a structure such as that shown in FIGS. 1A and 1B or FIGS. 10A to 11B, for example. Here, the above-mentioned stations 1 and 2 are any of a transmitting station, a repeater station, and a receiving station. The signal light propagating through the transmission line is sent out from the station 1, subsequently passes through the single-mode optical fiber 3 and the dispersion-equalizing optical fiber 4, and then reaches the station 2. Namely, as viewed in the propagating direction of signal light, the single-mode optical fiber 3 is disposed upstream from the dispersion-equalizing optical fiber 4. In addition, each of the single-mode optical fiber 3 and dispersion-equalizing optical fiber 4 is not necessarily be constituted by a single fiber (without a junction), but may comprise a plurality of optically connected fibers. FIG. 15B is a view showing the configuration of the optical transmission line according to a second embodiment. As depicted, the single-mode optical fiber 3 can be constituted by a plurality of single-mode optical fibers $3_{-1}$ to $3_{-3}$, whereas the dispersion-equalizing optical fiber 4 can be constituted by a plurality of dispersion-equalizing optical fibers $4_{-1}$ to $4_{-3}$.

As shown in FIG. 15A, let L (km) be the whole length of the optical transmission line, and f be the ratio thereof occupied by the dispersion-equalizing optical fiber 4. Namely, let (1−f) L be the length of the single-mode optical fiber 3, and f·L be the length of the dispersion-equalizing optical fiber 4. Let $D_0$ (ps/nm/km) and $S_0$ (ps/nm²/km) be the dispersion and dispersion slope of the single-mode optical fiber 3 at a wavelength of 1.55 μm, respectively. Let $D_1$ (ps/nm/km) and $S_1$ (ps/nm²/km) be the dispersion and dispersion slope of the dispersion-equalizing optical fiber 4 at a wavelength of 1.55 μm, respectively.

In this case, the dispersion TD (ps/nm) and dispersion slope TS (ps/nm²) of the whole optical transmission line at the wavelength of 1.55 μm are:

$$TD = D_0 \cdot (1-f) \cdot L + D_1 \cdot f \cdot L \quad (7)$$

$$TS = S_0 \cdot (1-f) \cdot L + S_1 \cdot f \cdot L \quad (8)$$

On the other hand, as mentioned above, at the wavelength of 1.55 μm, the ratio ($S_1/D_1$) of the dispersion slope $S_1$ to the dispersion $D_1$ in the dispersion-equalizing optical fiber 4 and the ratio ($S_0/D_0$) of the dispersion slope $S_0$ to the dispersion $D_0$ in the single-mode optical fiber 3 are on a par with each other, whereby expressions of proportional relation:

$$D_1 = k \cdot D_0 \quad (9)$$

$$S_1 = k \cdot S_0 \quad (10)$$

hold true as approximate expressions.

When the above-mentioned expressions (9) and (10) are inputted in the above-mentioned expressions (7) and (8), respectively, then the following expressions:

$$TD = [(1-f) + k \cdot f] \cdot D_0 \cdot L \quad (11)$$

$$TS = [(1-f) + k \cdot f] \cdot S_0 \cdot L \quad (12)$$

are obtained. As can be seen from these expressions, if $$k \approx -(1-f)/f \quad (13)$$

then both the dispersion TD and dispersion slope TS of the whole optical transmission line at the wavelength of 1.55 μm become substantially zero.

Meanwhile, according to each of the respective values of dispersion and dispersion slope in the above-mentioned optical fibers, the value of k ($=D_1/D_0=S_1/S_0$) is approximately such that $k \leq -1$. Therefore, when the dispersion-equalizing optical fiber 4 which is appropriately designed in terms of dispersion $D_1$ and dispersion slope $S_1$ is used such that the ratio f occupied by the dispersion-equalizing optical fiber 4 in the whole length L of the optical transmission line is about 50% or less, then both the dispersion TD and dispersion slope TS of the whole optical transmission line at the wavelength of 1.55 μm can be made substantially zero.

In the optical transmission line according to this embodiment, the single-mode optical fiber 3 is disposed on the upstream side, whereas the dispersion-equalizing optical fiber 4 is disposed on the downstream side. Thus, the signal light sent out from the station 1 initially propagates through the single-mode optical fiber 3, thereby attenuating to a certain extent, and then enters the dispersion-equalizing optical fiber 4. The effective area of the dispersion-equalizing optical fiber 4 is not so large, but is 15 μm² or more, preferably 17 μm² or more, further preferably 19 μm² or more. Since the optical power of the signal light propagating through the dispersion-equalizing optical fiber 4 is smaller than the initial optical power thereof at the time when sent out from the station 1, nonlinear optical phenomena are restrained from occurring in the dispersion-equalizing optical fiber 4.

Also, each of the single-mode optical fiber 3 and dispersion-equalizing optical fiber 4 constituting the optical transmission line according to this embodiment has a dispersion greater than that of the dispersion-flattened optical fiber mentioned in Related Background Art, thereby restraining nonlinear optical phenomena from occurring.

In particular, the single-mode optical fiber 3 preferably has such a length that its transmission loss becomes 3.3 dB or more with respect to light having a wavelength of 1.55 μm. In this case, if the optical power of the signal light sent out from the station 1 is such that nonlinear optical phenomena do not occur in the single-mode optical fiber 3 at all or, if any, are not problematic, then the nonlinear optical phenomena are sufficiently restrained from occurring in the dispersion-equalizing optical fiber 4 as well. Namely, letting Ass be the effective area of the single-mode optical fiber 3, $A_{DEF}$ be the effective area of the dispersion-equalizing optical fiber 4, $P_{SMF}$ be the optical power at the entrance end of the single-mode optical fiber 3, and $P_{DEF}$ be the optical power at the entrance end of the dispersion-equalizing optical fiber 4, the condition under which the nonlinear characteristic near the entrance end of the single-mode optical fiber 3 becomes greater than that near the entrance end of the single-mode optical fiber 4 is $$P_{SMF}/A_{SMF} > P_{DEF}/A_{DEF}. \quad (14)$$

From this expression, if the transmission loss level Loss of the single-mode optical fiber 3 is $$\text{Loss} = -10 \cdot \log(P_{DEF}/P_{SMF}) > -10 \cdot \log(A_{DEF}/A_{SMF}) \quad (15)$$

such that nonlinear optical phenomena do not occur in the single-mode optical fiber 3, then nonlinear optical phenomena are sufficiently restrained from occurring in the dispersion-equalizing optical fiber 4 as well. In this expression, letting the effective area $A_{SMF}$ of the single-mode optical fiber 3 with respect to light having a wavelength of 1.55 μm be 80 μm², and the effective area $A_{DEF}$ of the dispersion-equalizing optical fiber 4 with respect to light having a wavelength of 1.55 μm be 37 μm² at which the bending loss at a diameter of 20 mm becomes 50 dB/m or less, the transmission loss, Loss, of the single-mode optical fiber 3 with respect to light having a wavelength of 1.55 μm becomes 3.3 dB or more. More preferably, the effective area $A_{DEF}$ of the dispersion-equalizing optical fiber 4 with respect to light having a wavelength of 1.55 μm is 30 μm² at which the bending loss at a diameter of 20 mm becomes 10 dB/m or less, whereby the transmission loss, Loss, of the single-mode optical fiber 3 with respect to light having a wavelength of 1.55 μm becomes 4.3 dB or more.

Since the dispersion of this dispersion-equalizing optical fiber at a wavelength of 1.55 μm is −83 ps/nm/km or more, and the dispersion of the single-mode optical fiber at the wavelength of 1.55 μm is 17 ps/nm/km or more, the ratio of the length of the single-mode optical fiber to the length of dispersion-equalizing optical fiber is on the order of 1:1 to 4.9:1. When such an optical transmission line is employed as the transmission line between individual repeaters in a submarine cable, in view of the fact that one span (repeater spacing) of the submarine cable is about 50 km in general, it is necessary for the above-mentioned single-mode optical fiber to have a length of less than 42 km. Also, from FIGS. 2B to 2D, in view of the balance between the transmission loss and the nonlinear characteristic (indicated by the nonlinear index in FIG. 2C), it is preferred that the relative refractive index difference $\Delta^-$ of the inner cladding with respect to the outer cladding be on the order of $-0.6\%$ to $-0.7\%$. In a dispersion-equalizing optical fiber in which $\Delta^- = -0.7\%$, among others, the effective area $A_{\textit{eff}} \geq 15$ μm$^2$ when the DEF ratio is about 27%, whereby the nonlinear characteristic is minimized (see curve G300 in FIGS. 2B and 2C). If the DEF ratio further decreases from 27% (the ratio occupied by the single-mode optical fiber increases), then both the transmission loss and nonlinear characteristic enhance, whereby the transmission cannot be secured sufficiently. In view of these facts, the upper limit of the ratio of the length occupied by the single-mode optical fiber in the optical transmission line is about 73%. In particular, when the optical transmission line having the above-mentioned structure is employed as a transmission line (having a length of about 50 km) between repeaters in the above-mentioned submarine cable, the length of the single-mode optical fiber is 36.5 km or less. As a consequence, letting the transmission loss of this single-mode optical fiber be 0.195 dB/km (in the case of the optical fiber whose core is doped with Ge element), the upper limit of the total transmission loss of the single-mode optical fiber is preferably 7.1 dB or less.

The single-mode optical fiber 3 may be a single-mode optical fiber (whose core is made of pure silica) having a zero-dispersion wavelength in a 1.3-μm band, in which a cladding mainly composed of silica glass is doped with F element. In this type of single-mode optical fiber 3, at a wavelength of 1.55 μm, the dispersion is about 19 ps/nm/km, while the dispersion slope is about 0.06 ps/nm$^2$/km. When the dispersion-equalizing optical fiber 4 appropriately designed in terms of the dispersion D, and dispersion slope $S_1$ is employed, both the dispersion and dispersion slope S in the whole optical transmission line can be made substantially zero with respect to light having a wavelength of 1.55 μm in this case as well.

Employing the single-mode optical fiber having a cladding doped with F element has merits as follows. Namely, since the dispersion value is about 19 ps/nm/km, thus being greater than that of typical single-mode optical fibers, nonlinear optical phenomena are less likely to occur. Also, since the core region is made of pure silica or silica doped with a minute amount of Ge element, Rayleigh scattering is weak, and loss is small. As compared with typical single-mode optical fibers, the mode-field diameter (MFD) is smaller, thus yielding a smaller difference in mode field diameter from the dispersion-equalizing optical fiber 4, whereby the splice loss with respect to the dispersion-equalizing optical fiber 4 is smaller (transmission loss caused by mode mismatching is smaller).

Also, since the single-mode optical fiber 3 having a cladding doped with F element has an effective area of about 75 μm$^2$, its length is preferably such that the transmission loss with respect to light having a wavelength of 1.55 μm becomes 3.0 dB or more. Also in this case, if the optical power of the signal light sent out from the station 1 is such that nonlinear optical phenomena do not occur in the single-mode optical fiber 3 at all or, if any, are not problematic, then the nonlinear optical phenomena are sufficiently restrained from occurring in the dispersion-equalizing optical fiber 4 as well. More preferably, the effective area $A_{DEF}$ Of the dispersion-equalizing optical fiber 4 with respect to light having a wavelength of 1.55 μm is 30 μm$^2$ at which the bending loss at a diameter of 20 mm becomes 10 dB/m or less, whereby the transmission loss, Loss, of the single-mode optical fiber 3 with respect to light having a wavelength of 1.55 μm becomes 4.0 dB or more.

The length of the single-mode optical fiber having an F-doped cladding is also required to be less than 42 km when its application to a submarine cable having a span of about 50 km is taken into consideration. Also, for effectively suppressing the nonlinear optical phenomena, the upper limit of the ratio of length of the single-mode optical fiber in the optical transmission line is preferably about 73% (36.5 km), so that, letting the transmission loss of the F-doped single-mode optical fiber be 0.175 dB/km, the total transmission loss of the F-doped single-mode optical fiber is 6.4 dB or less.

As mentioned above, representative examples of the single-mode optical fiber 3 having a zero-dispersion wavelength in a 1.3-μm wavelength band include a typical optical fiber whose core and cladding are mainly composed of silica, whereas the core is doped with Ge element; and an optical fiber whose core and cladding are mainly composed of silica, whereas the cladding is doped with F element. The values of dispersion and dispersion slope in these single-mode optical fibers 3 are represented by those mentioned above but fluctuate in the vicinity of the latter. Nevertheless, as long as the dispersion and dispersion slope in the dispersion-equalizing optical fiber 4 according to the present invention lie within the ranges represented by the above-mentioned expressions (2) and (3), respectively, both the dispersion and dispersion slope of the whole optical transmission line can be made substantially zero when the ratio of the length of the single-mode optical fiber 3 to the length of the dispersion-equalizing optical fiber 4 is appropriately set, even if the individual values of dispersion and dispersion slope in the single-mode optical fibers 3 fluctuate.

Without being restricted to the above-mentioned embodiments, the present invention can be modified in various manners. For example, the specific design of the dispersion-equalizing optical fiber is not limited to those of the individual embodiments mentioned above, but can be altered within the ranges satisfying the above-mentioned expressions (2) and (3). In the case where bidirectional communications are carried out in an optical transmission line between stations, this optical transmission line is preferably constituted by a first single-mode optical fiber, a dispersion-equalizing optical fiber according to the present invention, and a second single-mode optical fiber which are substantially cascaded in this order. In this case, since the signal light sent out from each station propagates through the dispersion-equalizing optical fiber after having propagated through the first or second single-mode optical fiber, nonlinear optical phenomena are restrained from occurring.

As explained in the foregoing, the dispersion-equalizing optical fiber according to the present invention makes it possible to realize an optical transmission line enabling WDM communications in a wide signal light wavelength band centered at a wavelength of 1.55 μm, in which nonlinear optical phenomena are less likely to occur. Also, in an optical transmission line in which this dispersion-equalizing optical fiber and a single-mode optical fiber having a zero-dispersion wavelength in a 1.3-µm wavelength band are adjusted to their respective appropriate lengths, the wavelength dependence of the dispersion and dispersion slope in the whole optical transmission line is sufficiently reduced, so that both the dispersion and dispersion slope become substantially zero.

Also, since the dispersion-equalizing optical fiber according to the present invention has a refractive index profile of a depressed cladding structure, its bending loss, which may become problematic when making a module, can effectively be restrained from increasing.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-equalizing optical fiber constituting a part of an optical transmission line;
    wherein said dispersion-equalizing optical fiber comprises a core extending along a predetermined axis, an outer cladding provided on the outer periphery of said core, and a depressed region provided between said core and said outer cladding;
    wherein said dispersion-equalizing optical fiber has a dispersion D (unit: ps/nm/km) and a dispersion slope S (unit: ps/nm²/km) satisfying the following conditions:

$-57 \leq D \leq -28.5$ $0.0050 \times D \leq S \leq 0.0025 \times D$ at a wavelength of 1.55 µm;
    wherein said dispersion-equalizing optical fiber has, at the wavelength of 1.55 µm, an effective area of 15 µm² or more, and a bending loss of 50 dB/m or less when wound at a diameter of 20 mm;
    wherein said depressed region has a refractive index lower than those of both said core and said outer cladding; and
    wherein a ratio Ra of an outer diameter of said core with respect to that of said depressed region is greater than 0.4.

2. A dispersion-equalizing optical fiber according to claim 1, further comprising an intermediate cladding provided between said depressed region and said outer cladding, said intermediate cladding having a refractive index lower than that of said core but higher than that of said outer cladding.

3. A dispersion-equalizing optical fiber according to claim 1, wherein a relative refractive index difference of said core with respect to said outer cladding is 0.72% or more but 1.8% or less.

4. A dispersion-equalizing optical fiber according to claim 3, wherein the relative refractive index difference of said core with respect to said outer cladding is 0.9% or more but 1.6% or less.

5. A dispersion-equalizing optical fiber according to claim 1, wherein said dispersion-equalizing optical fiber has, at the wavelength of 1.55 µm, a bending loss of 10 dB/m or less when wound at the diameter of 20 mm.

6. A dispersion-equalizing optical fiber according to claim 1, wherein said dispersion-equalizing optical fiber has, at the wavelength of 1.55 µm, a polarization mode dispersion of 0.15 ps·km$^{-1/2}$ or less.

7. A dispersion-equalizing optical fiber according to claim 1, wherein said dispersion-equalizing optical fiber has a fiber diameter of 115 µm or more but 200 µm or less.

8. A dispersion-equalizing optical fiber according to claim 1, wherein said dispersion-equalizing optical fiber further comprises a coating layer provided on the outer periphery of said outer cladding, said coating layer having an outside diameter of 235 µm or more but 415 µm or less.

9. An optical transmission line comprising:
    a single-mode optical fiber having a zero-dispersion wavelength near a wavelength of 1.3 µm; and
    the dispersion-equalizing optical fiber of claim 1, disposed such that light having propagated through said single-mode optical fiber is incident thereon.

10. An optical transmission line according to claim 9, wherein said single-mode optical fiber has a zero-dispersion wavelength of 1.25 µm or more but 1.45 µm or less.

11. An optical transmission line according to claim 9, wherein said single-mode optical fiber and said dispersion-equalizing optical fiber have a total length m satisfying the condition of:

$0.9 \times L < m \leq L$ where L is the distance between stations between which said optical transmission line is provided.

12. An optical transmission line according to claim 11, wherein said single-mode optical fiber has a length of 42 km or less.

13. An optical transmission line according to claim 9, wherein said single-mode optical fiber has a total transmission loss of 3.3 dB or more at a wavelength of 1.55 µm.

14. An optical transmission line according to claim 13, wherein said single-mode optical fiber has a total transmission loss of 7.1 dB or less at the wavelength of 1.55 µm.

15. An optical transmission line comprising:
    a single-mode optical fiber having a zero-dispersion wavelength near a wavelength of 1.3 µm, said single-mode optical fiber having a cladding doped with a predetermined amount of F element; and
    the dispersion-equalizing optical fiber of claim 1 provided such that light having propagated through said single-mode optical fiber is incident thereon.

16. An optical transmission line according to claim 15, wherein said single-mode optical fiber has a zero-dispersion wavelength of 1.25 µm or more but 1.45 µm or less.

17. An optical transmission line according to claim 15, wherein said single-mode optical fiber and said dispersion-equalizing optical fiber have a total length m satisfying the condition of:

$0.9 \times L < m \leq L$ where L is the distance between stations between which said optical transmission line is provided.

18. An optical transmission line according to claim 17, wherein said single-mode optical fiber has a length of 42 km or less.

19. An optical transmission line according to claim 15, wherein said single-mode optical fiber has a total transmission loss of 3.0 dB or more at a wavelength of 1.55µm.

20. An optical transmission line according to claim 19, wherein said single-mode optical fiber has a total transmission loss of 6.4 dB or less at the wavelength of 1.55 µm.

21. A dispersion-equalizing optical fiber according to claim 1, wherein a relative refractive index difference of said core with respect to said outer cladding is 1.2% or more but 1.6% or less, and a relative refractive index difference of said depressed region with respect to said outer cladding is −0.7% or more but −0.44% or less.

22. A dispersion-equalizing optical fiber according to claim 1, wherein a relative refractive index difference of said core with respect to said outer cladding is 1.2% or more but 1.6% or less, and a relative refractive index difference of said depressed region with respect to said outer cladding is −0.7% or more but −0.6% or less.

23. A dispersion-equalizing optical fiber according to claim 1, wherein said outer cladding is positioned at a most outer side of said dispersion-equalizing optical fiber, and said core is in direct contact with said depressed region, and
wherein the outer diameter of said core is defined by a diameter where the refractive index of said core corresponds to the refractive index of said outer cladding, and the outer diameter of said depressed region is defined by a diameter of outer periphery thereof where the refractive index of said depressed region corresponds to the refractive index of said outer cladding.

24. A dispersion-equalizing optical fiber constituting a part of an optical transmission line; said dispersion-equalizing optical fiber comprising:
a core extending along a predetermined axis, said core having a predetermined refractive index;
an outer cladding provided on the outer periphery of said core; and
a depressed region provided between said core and said outer cladding, said depressed region having a refractive index lower than those of both said core and said outer cladding;
said dispersion-equalizing optical fiber having a dispersion D (unit: ps/nm/km) and a dispersion slope S (unit: ps/nm²/km) satisfying the following conditions:

$$-57 \leq D \leq -28.5$$

$$0.0050 \times D \leq S \leq 0.0025 \times D$$

at a wavelength of 1.55 μm;
said dispersion-equalizing optical fiber having, at the wavelength of 1.55 μm, an effective area of 17 μm² or more; and
a ratio Ra of an outer diameter of said core with respect to that of said depressed region being greater than 0.4.

25. A dispersion-equalizing optical fiber according to claim 24, further comprising an intermediate cladding provided between said depressed region and said outer cladding, said intermediate cladding having a refractive index lower than that of said core but higher than that of said outer cladding.

26. A dispersion-equalizing optical fiber according to claim 24, wherein a relative refractive index difference of said core with respect to said outer cladding is 0.72% or more but 1.6% or less.

27. A dispersion-equalizing optical fiber according to claim 26, wherein the relative refractive index difference of said core with respect to said outer cladding is 0.9% or more but 1.6% or less.

28. A dispersion-equalizing optical fiber according to claim 24, wherein said dispersion-equalizing optical fiber has, at the wavelength of 1.55 μm, a bending loss of 10 dB/m or less when wound at a diameter of 20 mm.

29. A dispersion-equalizing optical fiber according to claim 24, wherein said dispersion-equalizing optical fiber has, at the wavelength of 1.55 μm, a polarization mode dispersion of 0.15 ps·km$^{-1/2}$ or less.

30. A dispersion-equalizing optical fiber according to claim 24, wherein said dispersion-equalizing optical fiber has a fiber diameter of 115 μm or more but 200 μm or less.

31. A dispersion-equalizing optical fiber according to claim 24, wherein said dispersion-equalizing optical fiber further comprises a coating layer provided on the outer periphery of said outer cladding, said coating layer having an outside diameter of 235 μm or more but 415 μm or less.

32. An optical transmission line comprising:
a single-mode optical fiber having a zero-dispersion wavelength near a wavelength of 1.3 μm; and
the dispersion-equalizing optical fiber of claim 24, provided such that light having propagated through said single-mode optical fiber is incident thereon.

33. An optical transmission line according to claim 32, wherein said single-mode optical fiber has a zero-dispersion wavelength of 1.25 μm or more but 1.45 μm or less.

34. An optical transmission line according to claim 32, wherein said single-mode optical fiber and said dispersion-equalizing optical fiber have a total length m satisfying the condition of:

$$0.9 \times L < m \leq L$$

where L is the distance between stations between which said optical transmission line is provided.

35. An optical transmission line according to claim 34, wherein said single-mode optical fiber has a length of 42 km or less.

36. An optical transmission line according to claim 32, wherein said single-mode optical fiber has a total transmission loss of 3.3 dB or more at a wavelength of 1.55μm.

37. An optical transmission line according to claim 36, wherein said single-mode optical fiber has a total transmission loss of 7.1 dB or less at the wavelength of 1.55 μm.

38. An optical transmission line comprising:
a single-mode optical fiber having a zero-dispersion wavelength near a wavelength of 1.3 μm, said single-mode optical fiber having a cladding doped with a predetermined amount of F element; and
the dispersion-equalizing optical fiber of claim 24 provided such that light having propagated through said single-mode optical fiber is incident thereon.

39. An optical transmission line according to claim 38, wherein said single-mode optical fiber has a zero-dispersion wavelength of 1.25 μm or more but 1.45 μm or less.

40. An optical transmission line according to claim 38, wherein said single-mode optical fiber and said dispersion-equalizing optical fiber have a total length m satisfying the condition of:

$$0.9 \times L < m \leq L$$

where L is the distance between stations between which said optical transmission line is provided.

41. An optical transmission line according to claim 40, wherein said single-mode optical fiber has a length of 42 km or less.

42. An optical transmission line according to claim 38, wherein said single-mode optical fiber has a total transmission loss of 3.0 dB or more at a wavelength of 1.55 μm.

43. An optical transmission line according to claim 42, wherein said single-mode optical fiber has a total transmission loss of 6.4 dB or less at the wavelength of 1.55 μm.

44. A dispersion-equalizing optical fiber according to claim 24, wherein a relative refractive index difference of said core with respect to said outer cladding is 1.2% or more but 1.6% or less, and a relative refractive index difference of said depressed region with respect to said outer cladding is −0.7% or more but −0.44% or less.

45. A dispersion-equalizing optical fiber according to claim 24, wherein a relative refractive index difference of said core with respect to said outer cladding is 1.2% or more but 1.6% or less, and a relative refractive index difference of said depressed region with respect to said outer cladding is −0.7% or more but −0.6% or less.

46. A dispersion-equalizing optical fiber according to claim 24, wherein said outer cladding is positioned at a most outer side of said dispersion-equalizing optical fiber, and said core is in direct contact with said depressed region, and
wherein the outer diameter of said core is defined by a diameter where the refractive index of said core corresponds to the refractive index of said outer cladding, and the outer diameter of said depressed region is defined by a diameter of outer periphery thereof where the refractive index of said depressed region corresponds to the refractive index of said outer cladding.

47. A dispersion-equalizing optical fiber constituting a part of an optical transmission line;
wherein said dispersion-equalizing optical fiber comprises a core extending along a predetermined axis, an outer cladding provided on the outer periphery of said core, and a depressed region provided between said core and said outer cladding;
wherein said dispersion-equalizing optical fiber has a dispersion D (unit: ps/nm/km) and a dispersion slope S (unit: ps/nm²/km) satisfying the following conditions:

$$-57 \leq D \leq -28.5$$
$$0.0050 \times D \leq S \leq 0.0025 \times D$$

at a wavelength of 1.55 μm;
wherein said dispersion-equalizing optical fiber has, at the wavelength of 1.55 μm, an effective area of 19 μm² or more, and a bending loss of 50 dB/m or less when wound at a diameter of 20 mm;
wherein said depressed region has a refractive index lower than those of both said core and said outer cladding; and
wherein a ratio Ra of an outer diameter of said core with respect to that of said depressed region is greater than 0.4.

48. A dispersion-equalizing optical fiber according to claim 47, further comprising an intermediate cladding provided between said depressed region and said outer cladding, said intermediate cladding having a refractive index lower than that of said core but higher than that of said outer cladding.

49. A dispersion-equalizing optical fiber according to claim 47, wherein a relative refractive index difference of said core with respect to said outer cladding is 0.72% or more but 1.8% or less.

50. A dispersion-equalizing optical fiber according to claim 49, wherein the relative refractive index difference of said core with respect to said outer cladding is 0.9% or more but 1.6% or less.

51. A dispersion-equalizing optical fiber according to claim 47, wherein said dispersion-equalizing optical fiber has, at the wavelength of 1.55 μm, a bending loss of 10 dB/m or less when wound at the diameter of 20 mm.

52. A dispersion-equalizing optical fiber according to claim 47, wherein said dispersion-equalizing optical fiber has, at the wavelength of 1.55μm, a polarization mode dispersion of 0.15 ps·km$^{-1/2}$ or less.

53. A dispersion-equalizing optical fiber according to claim 47, wherein said dispersion-equalizing optical fiber has a fiber diameter of 115 μm or more but 200 μm or less.

54. A dispersion-equalizing optical fiber according to claim 47, wherein said dispersion-equalizing optical fiber further comprises a coating layer provided on the outer periphery of said outer cladding, said coating layer having an outside diameter of 235 μm or more but 415 μm or less.

55. An optical transmission line comprising:
a single-mode optical fiber having a zero-dispersion wavelength near a wavelength of 1.3 μm; and
the dispersion-equalizing optical fiber of claim 47 provided such that light having propagated through said single-mode optical fiber is incident thereon.

56. An optical transmission line according to claim 55, wherein said single-mode optical fiber has a zero-dispersion wavelength of 1.25 μm or more but 1.45 μm or less.

57. An optical transmission line according to claim 55, wherein said single-mode optical fiber and said dispersion-equalizing optical fiber have a total length m satisfying the condition of:

$$0.9 \times L < m \leq L$$

where L is the distance between stations between which said optical transmission line is provided.

58. An optical transmission line according to claim 57, wherein said single-mode optical fiber has a length of 42 km or less.

59. An optical transmission line according to claim 55, wherein said single-mode optical fiber has a total transmission loss of 3.3 dB or more at a wavelength of 1.55 μm.

60. An optical transmission line according to claim 59, wherein said single-mode optical fiber has a total transmission loss of 7.1 dB or less at the wavelength of 1.55 μm.

61. An optical transmission line comprising:
a single-mode optical fiber having a zero-dispersion wavelength near a wavelength of 1.3 μm, said single-mode optical fiber having a cladding doped with a predetermined amount of F element; and
the dispersion-equalizing optical fiber of claim 47 provided such that light having propagated through said single-mode optical fiber is incident thereon.

62. An optical transmission line according to claim 61, wherein said single-mode optical fiber has a zero-dispersion wavelength of 1.25 μm or more but 1.45 μm or less.

63. An optical transmission line according to claim 61, wherein said single-mode optical fiber and said dispersion-equalizing optical fiber have a total length m satisfying the condition of:

$$0.9 \times L < m \leq L$$

where L is the distance between stations between which said optical transmission line is provided.

64. An optical transmission line according to claim 63, wherein said single-mode optical fiber has a length of 42 km or less.

65. An optical transmission line according to claim 61, wherein said single-mode optical fiber has a total transmission loss of 3.0 dB or more at a wavelength of 1.55 μm.

66. An optical transmission line according to claim 65, wherein said single-mode optical fiber has a total transmission loss of 6.4 dB or less at the wavelength of 1.55 μm.

67. A dispersion-equalizing optical fiber according to claim 47, wherein a relative refractive index difference of said core with respect to said outer cladding is 1.2% or more but 1.6% or less, and a relative refractive index difference of said depressed region with respect to said outer cladding is −0.7% or more but −0.44% or less.

68. A dispersion-equalizing optical fiber according to claim 47, wherein a relative refractive index difference of said core with respect to said outer cladding is 1.2% or more but 1.6% or less, and a relative refractive index difference of said depressed region with respect to said outer cladding is −0.7% or more but −0.6% or less.

69. A dispersion-equalizing optical fiber according to claim 47, wherein said outer cladding is positioned at a most outer side of said dispersion-equalizing optical fiber, and said core is in direct contact with said depressed region, and wherein the outer diameter of said core is defined by a diameter where the refractive index of said core corresponds to the refractive index of said outer cladding, and the outer diameter of said depressed region is defined by a diameter of outer periphery thereof where the refractive index of said depressed region corresponds to the refractive index of said outer cladding.

* * * * *